US009578093B1

(12) United States Patent
Gotoh et al.

(10) Patent No.: US 9,578,093 B1
(45) Date of Patent: Feb. 21, 2017

(54) GEOGRAPHIC SPACE MANAGEMENT

(71) Applicant: International Business Machines Corporation, Armonk, NY (US)

(72) Inventors: Yasuhisa Gotoh, Yokohama (JP); Yasutaka Nishimura, Yamato (JP); Takahito Tashiro, Higashi-kurume (JP); Shoichiro Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/970,616

(22) Filed: Dec. 16, 2015

(51) Int. Cl.
*G06F 15/16* (2006.01)
*H04L 29/08* (2006.01)
*H04L 12/24* (2006.01)
*G01C 21/26* (2006.01)

(52) U.S. Cl.
CPC .......... *H04L 67/1002* (2013.01); *G01C 21/26* (2013.01); *H04L 41/142* (2013.01); *H04L 41/22* (2013.01)

(58) Field of Classification Search
CPC ........ H04L 67/10; H04L 41/142; H04L 41/22
USPC ....................................................... 709/224
See application file for complete search history.

(56) References Cited

U.S. PATENT DOCUMENTS

| 5,948,040 A | 9/1999 | Delorme et al. |
| 6,028,550 A | 2/2000 | Froeberg et al. |
| 6,150,961 A | 11/2000 | Alewine et al. |
| 6,556,825 B1 | 4/2003 | Mansfield |
| 7,395,151 B2 | 7/2008 | O'Neill et al. |
| 7,447,588 B1* | 11/2008 | Xu ................. G08G 1/0104 340/988 |
| 7,525,933 B1 | 4/2009 | Hall |
| 7,657,406 B2 | 2/2010 | Tolone et al. |
| 7,689,348 B2 | 3/2010 | Boss et al. |
| 7,710,421 B2 | 5/2010 | Muramatsu |
| 7,899,611 B2 | 3/2011 | Downs et al. |
| 7,979,172 B2 | 7/2011 | Breed |
| 8,000,887 B2 | 8/2011 | Nathan et al. |
| 8,064,378 B2 | 11/2011 | Karabinis |

(Continued)

FOREIGN PATENT DOCUMENTS

| CN | 102147260 A | 8/2011 |
| CN | 102231231 A | 11/2011 |

(Continued)

OTHER PUBLICATIONS

Dangel et al; Can Road Traffic Volume Information Improve Partitioning for Distributed SUMO?; 2015; pp. 61-74.*

(Continued)

*Primary Examiner* — Glenford Madamba
(74) *Attorney, Agent, or Firm* — Erik K. Johnson

(57) ABSTRACT

Geographic space may be managed by a system including a plurality of subsystems operable to respectively perform data processing, the data processing relating to traffic, of a plurality of regions, the plurality of regions obtained by dividing a geographic space including routes on which mobile objects move, and one or more servers collectively operable to obtain statistic information of at least one subsystem among the plurality of subsystems, the statistic information relating to a processing load of the at least one subsystem, and divide the geographic space into the plurality of regions based on the statistic information.

20 Claims, 22 Drawing Sheets

(56) References Cited

U.S. PATENT DOCUMENTS

| | | | |
|---|---|---|---|
| 8,195,436 | B2 | 6/2012 | Tolone et al. |
| 8,396,652 | B2 | 3/2013 | Nomura |
| 8,428,876 | B2 | 4/2013 | Lee |
| 8,473,263 | B2 | 6/2013 | Tolone et al. |
| 8,510,319 | B2 | 8/2013 | Stevens |
| 8,599,848 | B2 | 12/2013 | Janneteau et al. |
| 8,620,510 | B1 | 12/2013 | Meuth et al. |
| 8,768,012 | B2 | 7/2014 | Satoh |
| 8,799,246 | B2 | 8/2014 | Nomura et al. |
| 8,818,608 | B2 | 8/2014 | Cullinane et al. |
| 8,850,013 | B2 | 9/2014 | Waldman et al. |
| 8,862,146 | B2 | 10/2014 | Shatsky et al. |
| 8,930,269 | B2 | 1/2015 | He et al. |
| 8,988,252 | B2 | 3/2015 | Scholl et al. |
| 9,113,293 | B1 | 8/2015 | Rayburn et al. |
| 9,210,589 | B2 | 12/2015 | Panta et al. |
| 9,237,417 | B2 | 1/2016 | Marshall et al. |
| 2004/0172316 | A1 | 9/2004 | Hale et al. |
| 2005/0065711 | A1 | 3/2005 | Dahlgren et al. |
| 2007/0109303 | A1 | 5/2007 | Muramatsu |
| 2007/0241932 | A1 | 10/2007 | Otero et al. |
| 2008/0046134 | A1 | 2/2008 | Bruce et al. |
| 2009/0070024 | A1 | 3/2009 | Burchard et al. |
| 2009/0248758 | A1 | 10/2009 | Sawai et al. |
| 2009/0287405 | A1 | 11/2009 | Liu et al. |
| 2009/0311986 | A1 | 12/2009 | Bose et al. |
| 2009/0327918 | A1 | 12/2009 | Aaron et al. |
| 2010/0036595 | A1 | 2/2010 | Coy et al. |
| 2010/0188265 | A1 | 7/2010 | Hill et al. |
| 2010/0199213 | A1 | 8/2010 | Suzuki |
| 2011/0037619 | A1 | 2/2011 | Ginsberg et al. |
| 2011/0103302 | A1 | 5/2011 | Hall |
| 2011/0205040 | A1 | 8/2011 | Van Wiemeersch et al. |
| 2011/0276692 | A1 | 11/2011 | Waldman et al. |
| 2012/0092187 | A1 | 4/2012 | Scholl et al. |
| 2012/0291049 | A1 | 11/2012 | Park et al. |
| 2013/0006925 | A1 | 1/2013 | Sawai et al. |
| 2013/0099941 | A1 | 4/2013 | Jana et al. |
| 2013/0204524 | A1 | 8/2013 | Fryer et al. |
| 2013/0214939 | A1 | 8/2013 | Washlow et al. |
| 2013/0244564 | A1 | 9/2013 | Hall |
| 2013/0321397 | A1 | 12/2013 | Chen et al. |
| 2014/0025432 | A1 | 1/2014 | Thomassen et al. |
| 2014/0120953 | A1 | 5/2014 | Ingram et al. |
| 2014/0136099 | A1 | 5/2014 | Choi et al. |
| 2014/0180773 | A1 | 6/2014 | Zafiroglu et al. |
| 2014/0191858 | A1 | 7/2014 | Morgan et al. |
| 2014/0195214 | A1 | 7/2014 | Kozloski et al. |
| 2014/0236414 | A1 | 8/2014 | Droz et al. |
| 2014/0248899 | A1 | 9/2014 | Emadzadeh et al. |
| 2014/0278026 | A1 | 9/2014 | Taylor |
| 2014/0278029 | A1 | 9/2014 | Tonguz et al. |
| 2014/0289267 | A1 | 9/2014 | Felix et al. |
| 2014/0370842 | A1 | 12/2014 | Abtin et al. |
| 2014/0378090 | A1 | 12/2014 | Hall |
| 2015/0039391 | A1 | 2/2015 | Hershkovitz et al. |
| 2015/0051822 | A1 | 2/2015 | Joglekar |
| 2015/0066284 | A1 | 3/2015 | Yopp |
| 2015/0120083 | A1 | 4/2015 | Gurovich et al. |
| 2015/0149019 | A1 | 5/2015 | Pilutti et al. |
| 2015/0179077 | A1 | 6/2015 | Morgan et al. |

FOREIGN PATENT DOCUMENTS

| | | | |
|---|---|---|---|
| CN | 102997928 | A | 3/2013 |
| CN | 103247176 | A | 8/2013 |
| CN | 103258043 | A | 8/2013 |
| CN | 2013/080241 | * | 11/2013 |
| CN | 103971529 | A | 8/2014 |
| DE | 10030819 | A1 | 1/2002 |
| DE | 102005020154 | A1 | 11/2006 |
| EP | 1914701 | A2 | 4/2008 |
| JP | 11083511 | A | 3/1999 |
| JP | 2001028004 | A | 1/2001 |
| JP | 2007286706 | A | 11/2007 |
| JP | 2008123197 | A | 5/2008 |
| JP | 2008123325 | A | 5/2008 |
| JP | 2008262418 | A | 10/2008 |
| JP | 2008294921 | A | 12/2008 |
| JP | 2009277078 | A | 11/2009 |
| JP | 2011158339 | A | 8/2011 |
| JP | 4985119 | B2 | 7/2012 |
| JP | 2012150515 | A | 8/2012 |
| JP | 2012155286 | A | 8/2012 |
| JP | 2013045242 | A | 3/2013 |
| JP | 2013101119 | A | 5/2013 |
| JP | 2013101120 | A | 5/2013 |
| JP | 2014065362 | A | 4/2014 |
| JP | 2014075008 | A | 4/2014 |
| JP | 2014095663 | A | 5/2014 |
| JP | 2015018396 | A | 1/2015 |
| JP | 2015081057 | A | 4/2015 |
| KR | 101354607 | B1 | 1/2014 |
| WO | 2007140527 | A1 | 12/2007 |
| WO | 2011081157 | A1 | 7/2011 |
| WO | 2012167174 | A1 | 12/2012 |
| WO | 2013167085 | A2 | 11/2013 |

OTHER PUBLICATIONS

Pawloski et al; Applying Event Stream Processing on Traffic Problem Detection; 2009; pp. 27-38.*

Abrogui et al; Efficient Load-Balancing and QoS-based location Aware Service Discovery Protocol for Vehicular Ad Hoc Networks; 2012; pp. 1-15.*

IEEE, "Server—Definition," IEEE 100: The Authoritative Dictionary of IEEE Standards Terms, 2000, p. 1031, Seventh Edition.

IEEE, "System—Definition," IEEE 100: The Authoritative Dictionary of IEEE Standards Terms, 2000, p. 1143-1144, Seventh Edition.

IBM, "List of IBM Patents or Patent Applications Treated as Related (Appendix P)," Mar. 28, 2016, p. 1-3.

Gotoh et al., "Geographic Space Management," Application and Drawings, filed Jun. 19, 2015, p. 1-97, U.S. Appl. No. 14/744,052.

Gotoh et al., "Geographic Space Management," Application and Drawings, filed Jun. 25, 2015, p. 1-95, U.S. Appl. No. 14/750,298.

Gotoh et al., "Geographic Space Management," Application and Drawings, filed Jun. 25, 2015, p. 1-95, U.S. Appl. No. 14/750,334.

Gotoh et al., "Geographic Space Management," Application and Drawings, filed Jul. 8, 2015, p. 1-93, U.S. Appl. No. 14/793,934.

Gotoh et al., "Geographic Space Management," Application and Drawings, filed Jun. 19, 2015, p. 1-95, U.S. Appl. No. 14/744,056.

Gotoh et al., "Geographic Space Management," Application and Drawings, filed Jul. 16, 2015, p. 1-92, U.S. Appl. No. 14/800,774.

Gotoh et al., "Geographic Space Management," Application and Drawings, filed Jul. 16, 2015, p. 1-92, U.S. Appl. No. 14/800,782.

Gotoh et al., "Geographic Space Management," Application and Drawings, filed Jun. 19, 2015, p. 1-94, U.S. Appl. No. 14/744,066.

Gotoh et al., "Geographic Space Management," Application and Drawings, filed Jul. 16, 2015, p. 1-91, U.S. Appl. No. 14/800,795.

Gotoh et al., "Geographic Space Management," Application and Drawings, filed Jul. 16, 2015, p. 1-91, U.S. Appl. No. 14/800,811.

Gotoh et al., "Geographic Space Management," Application and Drawings, filed Jul. 16, 2015, p. 1-93, U.S. Appl. No. 14/744,067.

Gotoh et al., "Geographic Space Management," Application and Drawings, filed Jul. 16, 2015, p. 1-91, U.S. Appl. No. 14/800,821.

Gotoh et al., "Geographic Space Management," Application and Drawings, filed Jul. 16, 2015, p. 1-91, U.S. Appl. No. 14/800,839.

Gotoh et al., "Management of Moving Objects," Application and Drawings, filed Jun. 19, 2015, p. 1-46, U.S. Appl. No. 14/744,071.

Gotoh et al., "Management of Moving Objects," Application and Drawings, filed Jul. 17, 2015, p. 1-46, U.S. Appl. No. 14/802,289.

Gotoh et al., "Management of Moving Objects," Application and Drawings, filed Jul. 17, 2015, p. 1-46, U.S. Appl. No. 14/802,316.

Yamamoto, "Management of Moving Objects," Application and Drawings, filed Jun. 19, 2015, p. 1-59, U.S. Appl. No. 14/744,074.

Yamamoto, "Management of Moving Objects," Application and Drawings, filed Jul. 17, 2015, p. 1-58, U.S. Appl. No. 14/802,343.

Yamamoto, "Management of Moving Objects," Application and Drawings, filed Jul. 17, 2015, p. 1-58, U.S. Appl. No. 14/802,361.

(56) References Cited

OTHER PUBLICATIONS

Gotoh et al., "Management of Events and Moving Objects," Application and Drawings, filed Jul. 7, 2015, p. 1-69, U.S. Appl. No. 14/792,805.
Gotoh et al., "Management of Events and Moving Objects," Application and Drawings, filed Jul. 16, 2015, p. 1-68, U.S. Appl. No. 14/801,014.
Gotoh et al., "Management of Events and Moving Objects," Application and Drawings, filed Jul. 16, 2015, p. 1-68, U.S. Appl. No. 14/801,054.
Miyahira et al., "Management of Mobile Objects and Service Platform for Mobile Objects," Application and Drawings, filed Dec. 16, 2015, p. 1-69, U.S. Appl. No. 14/970,596.
Nishimura et al., "Management of Dynamic Events and Moving Objects," Application and Drawings, filed Dec. 16, 2015, p. 1-92, U.S. Appl. No. 14/970,600.
Ishikawa et al., "Management of Evacuation With Mobile Objects," Application and Drawings, filed Dec. 16, 2015, p. 1-50, U.S. Appl. No. 14/970,609.
Gotoh et al., "Geographic Space Management," Application and Drawings, filed Dec. 16, 2015, p. 1-72, U.S. Appl. No. 14/970,616.
Ishikawa et al., "Management of Mobile Objects and Resources," Application and Drawings, filed Dec. 16, 2015, p. 1-52, U.S. Appl. No. 14/970,626.
Gotoh et al., "Management of Mobile Objects," Application and Drawings, filed Dec. 16, 2015, p. 1-65, U.S. Appl. No. 14/970,631.
Ishikawa et al., "Management of Mobile Objects," Application and Drawings, filed Dec. 16, 2015, p. 1-78, U.S. Appl. No. 14/970,643.
Abrougui et al., "Efficient load balancing and QoS-based location aware service discovery protocol for vehicular ad hoc networks," EURASIP Journal on Wireless Communications and Networking, Mar. 2012, p. 1-15, Springer.
Aulinas et al., "Local map update for large scale SLAM," Electronics Letters, Apr. 15, 2010, p. 1-2, vol. 46, No. 8.
Dangel et al., "Can Road Traffic Volume Information Improve Partitioning for Distributed SUMO?," Modeling Mobility with Open Data, Lecture Notes in Mobility, 2015, p. 61-74, Springer International Publishing.
DRM, "Local Dynamic Map," DRM Research Seminar, Jun. 30, 2010., p. 1-72, Japan Digital Road Map Association.
Hong et al., "A grid-based node split algorithm for managing current location data of moving objects," The Journal of Supercomputing, Dec. 2007, p. 321-337, vol. 42, Issue 3, Springer.

Hsu et al., "Automatic Traffic Monitoring Method Based on Cellular Model," Fifth International Conference on Intelligent Information Hiding and Multimedia Signal Processing, 2009, p. 640-643, IEEE Computer Society.
Ihm et al., "Advanced Spatial Data Management for Enterprise Applications," An Oracle White Paper, Aug. 2010, p. 1-16, Oracle Spatial 11g.
Openstreetmap, "QuadTiles," OpenStreetMap Wiki, Last Modified on Mar. 3, 2014, p. 1-10, http://wiki.openstreetmap.org/wiki/QuadTiles, Accessed on Jun. 15, 2015.
Ortelli, "Server-side clustering of geo-points on a map using Elasticsearch," Trifork Blog, Aug. 1, 2013, p. 1-14, http://blog.trifork.com/2013/08/01/server-side-clustering-of-geo-points-on-a-map-using-elasticsearch/, Accessed on Jun. 15, 2015.
Pawlowski et al., "Applying Event Stream Processing on Traffic Problem Detection," Progress in Artificial Intelligence (EPAI), 2009, p. 27-38, LNAI vol. 5816, Springer-Verlag Berlin Heidelberg.
Schade, "Sharing Data by Means of a Local Dynamic Map," Understanding the Standards for Cooperative ITS, Feb. 6, 2014, p. 1-10, MINES ParisTech, Transportation Sustainability Environment Consulting.
Suzumura et al., "X10-based Massive Parallel Large-Scale Traffic Flow Simulation," ProVISION, Winter 2012, p. 74-79, No. 72, IBM Professionals' Papers.
Y et al., "A Complex Event Processing System Approach to Real Time Road Traffic Event Detection," Journal of Convergence Information Technology (JCIT), Oct. 2013, p. 142-148, vol. 8, No. 15.
Yang et al., "Spatio-temporal Coupled Bayesian Robust Principal Component Analysis for Road Traffic Event Detection," Proceedings of the 16th International IEEE Annual Conference on Intelligent Transportation Systems (ITSC 2013), Oct. 6-9, 2013, p. 392-398, IEEE, The Hague, The Netherlands.
Gove et al., "NetVisia: Heat Map & Matrix Visualization of Dynamic Social Network Statistics & Content", 2011 IEEE International Conference on Privacy, Security, Risk, and Trust, and IEEE International Conference on Social Computing, Oct. 9-11, 2011, pp. 19-26.
IBM, "List of IBM Patents or Patent Applications Treated as Related (Appendix P)," Sep. 20, 2016, p. 1-2.
Nishimura et al., "Management of Dynamic Events and Moving Objects," Application and Drawings, filed Sep. 1, 2016, p. 1-91, U.S. Appl. No. 15/254,183.

* cited by examiner

GEOGRAPHIC SPACE MANAGEMENT

BACKGROUND

The present invention relates to a system for managing geographic space and providing navigational support.

As the geographic space being handled by driving support systems expands, the amount of information being transmitted, received, and processed increases, and the corresponding load might exceed the processing power of a single server. Even if the geographic space is divided, and a plurality of servers are used to process the spaces resulting from the division, automobiles move at high speeds among the plurality of divided geographic spaces, and therefore further communication between the servers is necessary, such that the processing capability may be exceeded even when a plurality of servers are used. Furthermore, when the geographic space is divided, the density of roads, the number of moving automobiles, and the like is different in each geographic space resulting from the division, and therefore there is a difference in system resources and workloads among servers, such that an overall efficiency of the system may drop when a load is focused on a certain server.

SUMMARY

According to a first aspect of the present invention, a system may include a plurality of subsystems operable to respectively perform data processing, the data processing relating to traffic, of a plurality of regions, the plurality of regions obtained by dividing a geographic space including routes on which mobile objects move, and one or more servers collectively operable to obtain statistic information of at least one subsystem among the plurality of subsystems, the statistic information relating to a processing load of the at least one subsystem, and divide the geographic space into the plurality of regions based on the statistic information. The first aspect may enable division of geographic space management among a plurality of subsystems based on statistic information.

The first aspect of the innovations may also include a computer-implemented method performed by the above apparatus, as well as a computer program product including a computer readable storage medium having program instructions embodied therewith, the program instructions executable by a processor to cause the processor to perform the computer-implemented method.

The summary clause does not necessarily describe all necessary features of the embodiments of the present invention. The present invention may also be a sub-combination of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
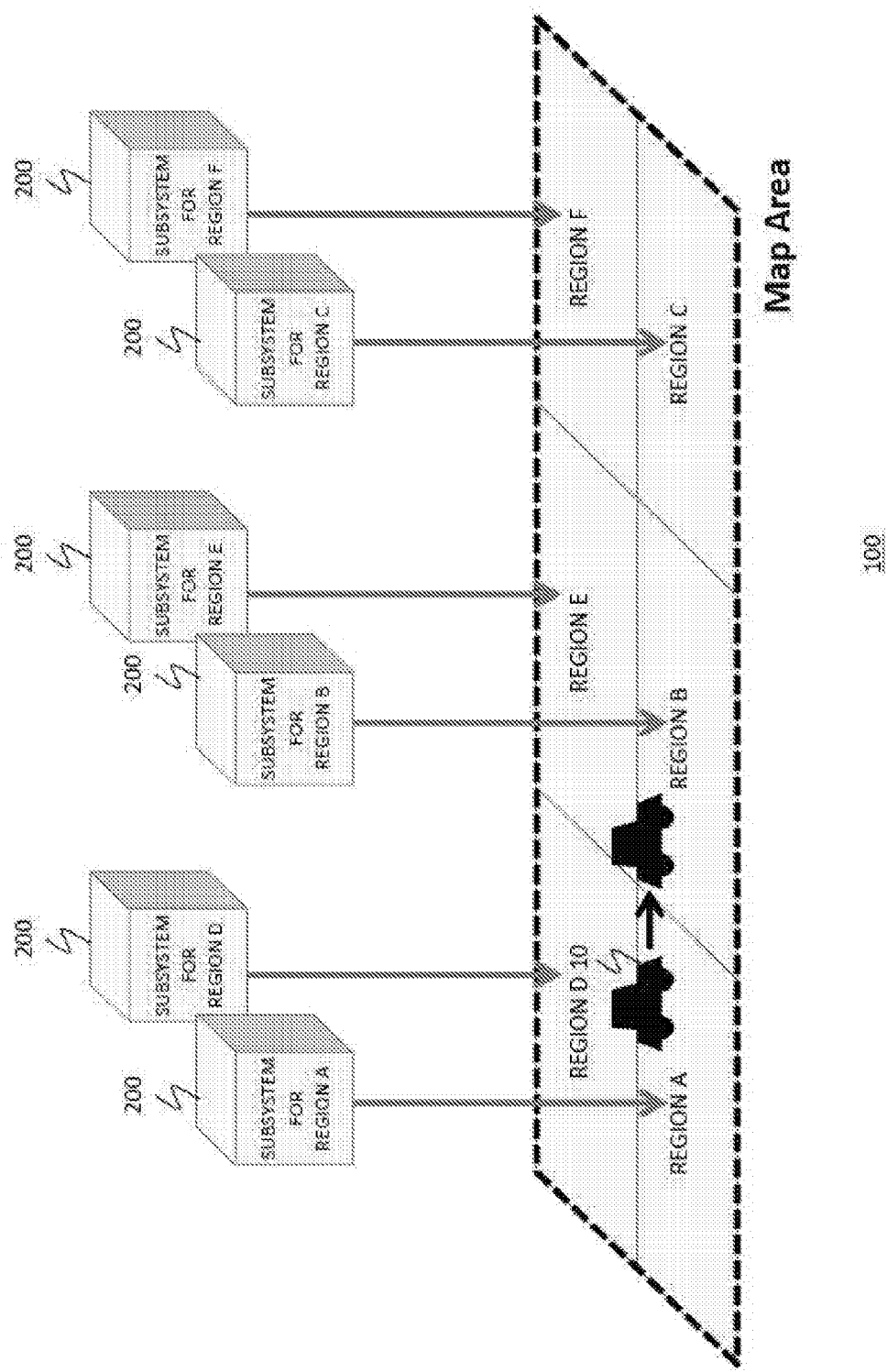
FIG. 1 shows a system and a map area corresponding to a geographic space managed by the system, according to an embodiment of the present invention.

FIG. 1 shows a system 100 and a map area corresponding to a geographic space managed by the system 100, according to an embodiment of the present invention. The system 100 manages a geographic space that includes routes on which a moving object 10 moves. The system 100 is operable to divide the geographic space into a plurality of regions, manage these regions, and dynamically change the boundary of at least one of the regions, which may improve the overall system efficiency. The moving object 10 may be a moving object that moves on routes including land routes, sea routes, and/or air routes, for example. The geographic space may be land, sea, or air space that includes the routes on which the moving object travels.

FIG. 1 shows an automobile as an example of the moving object 10, which moves along roads as examples of land routes. FIG. 1 shows an example in which the system 100 performs management by using map areas corresponding to a geographical area including a road on which the automobile is moving. The system 100 divides the map area into a plurality of regions and includes a plurality of subsystems 200 that respectively manage these regions. FIG. 1 shows an example in which the map area is divided into six regions from region A to region F, and six subsystems 200 respectively manage these six regions resulting from the division. In FIG. 1, region A to region F are shown as being separated from the subsystems 200, but each subsystem 200 may include a map of the corresponding region and these maps may be managed within the respective subsystems 200.

Each of the subsystems 200 may be implemented on a server, and portions of the system 100 other than the subsystems may also be implemented on one or more servers. In other words, the system 100 may be implemented on a plurality of servers, and each of the servers may include a processor and a computer readable storage medium storing a set of instructions that, when executed by the processor, causes the processor to operate. These servers may exist at any point on a network including the Internet, a subscriber network, a cellular network, or a desired combination of networks. The servers may be dedicated servers, or may be shared servers that perform other operations.

The system 100 acquires the positions of a moving object 10 from the moving object 10, and the subsystem 200 managing the region that includes the acquired position of the moving object 10 within the map area may manage the movement of this moving object 10. The system 100 acquires information such as events that have occurred to the moving object 10 and/or on the road outside, and the subsystem 200 managing the region including the position where such an event has occurred may manage the state of the event. Events may include information about accidents, obstructions, or construction on the road, or information about the weather, temperature, buildings, shops, or parking lots near the road. In response to a setting or a request from the moving object 10, the subsystem 200 may provide notification about the event information to the moving object 10 that made the request.

For example, if the moving object 10 is moving on a route in a geographical area corresponding to region A, then the subsystem 200 managing region A manages this moving object 10. The system 100 may increase or decrease the number of subsystems 200 according to the surface area of the geographic space to be managed.

Since the map area is divided into a plurality of regions, despite the moving object 10 simply moving on a route, the region corresponding to the position of the moving object 10 might change. FIG. 1 shows an example in which the moving object 10 is driving on a road such that the position of the moving object 10 moves from region A to region B. In this case, according to the movement of the moving object 10, the system 100 may transfer the information concerning the moving object 10 from the subsystem 200 managing region A to the subsystem 200 managing region B, and may also transfer the management of the moving object 10 to the subsystem 200 managing region B.

In this way, a transfer of management among the plurality of subsystems 200 occurs according to the movement of the moving object 10. Therefore, by transmitting and receiving information of moving objects 10 among the subsystems 200, the amount of information to be transmitted and received increases in response to an increase in the number of moving objects 10 and the number of routes. Furthermore, since the density of moving objects 10 and routes is not uniform among the regions, there are cases where the load may be overwhelming on a certain subsystem 200. Therefore, the system 100 of the present embodiment may dynamically change the boundary of at least one region to prevent a load imbalance and/or a decrease in productivity of the plurality of subsystems 200.

Figure 2:
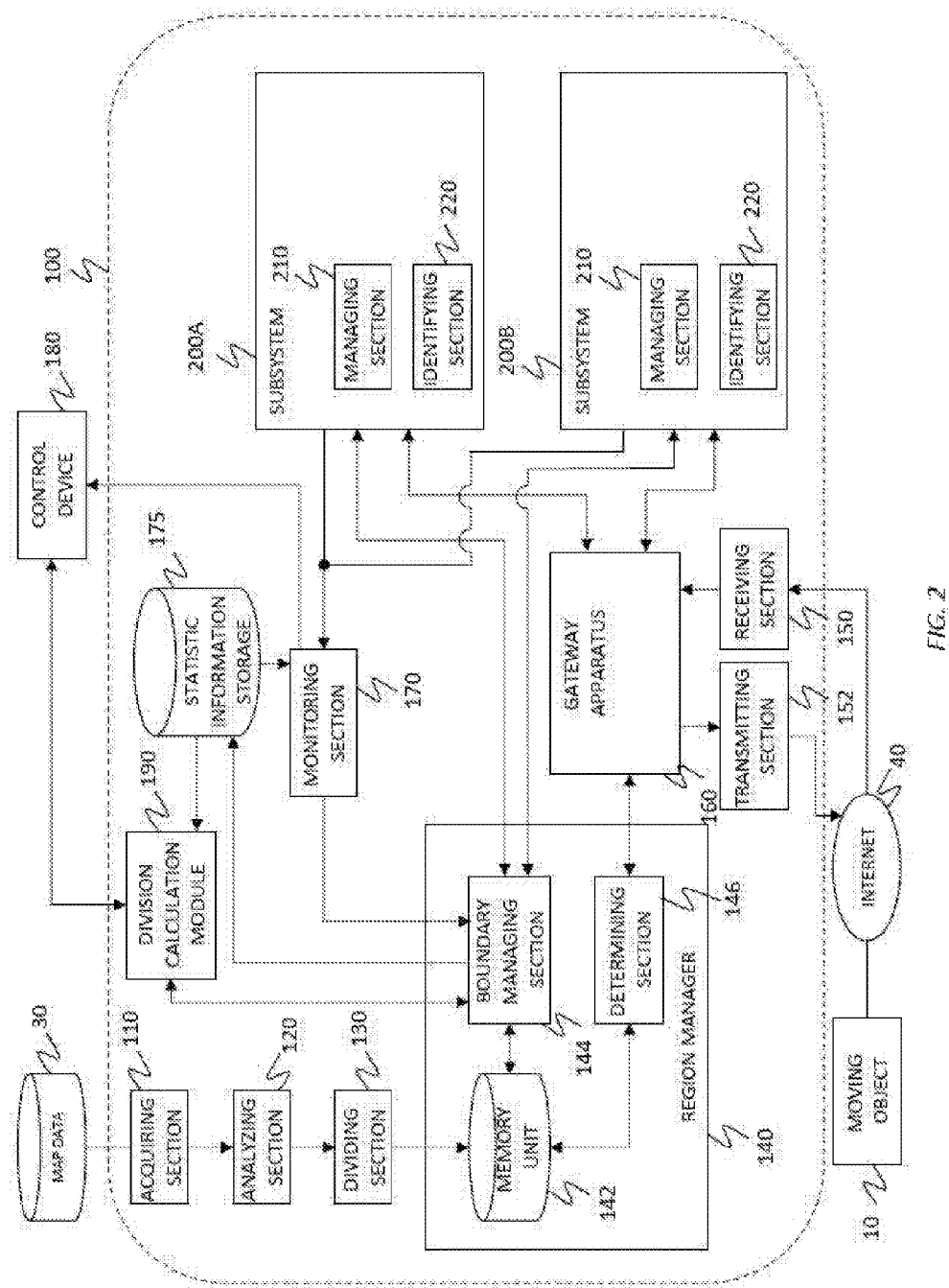
FIG. 2 shows an exemplary configuration of the system, according to an embodiment of the present invention.

FIG. 2 shows an exemplary configuration of the system 100, according to an embodiment of the present invention. The system 100 may be operable to communicate with each of a plurality of moving objects 10 to send and receive the information used to manage the moving objects 10. The system 100 may be operable to acquire map data and/or information exchanged with the moving objects 10, through the Internet, a subscriber network, a cellular network, or any desired combination of networks. The system 100 includes an acquiring section (i.e., module) 110, an analyzing section 120, a dividing section 130, a region manager 140, a receiving section 150, a transmitting section 152, a gateway apparatus 160, a monitoring section 170, a statistic information storage 175, a control device 180, a division calculation module 190, and a plurality of subsystems 200.

The acquiring section 110 may be operable to acquire map data corresponding to the geographical areas where a moving object 10 is positioned, from an external database 30, for example. In response to the map being updated, the acquiring section 110 may acquire some or all of the updated map data. The acquiring section 110 may be operable to acquire the map data from the Internet, a subscriber network, a cellular network, or any desired combination of networks. The system 100 may be operable to store the map data in advance.

The acquiring section 110 may further acquire an event that has occurred within the geographic space to be managed by the system 100. In this case, the acquiring section 110 may acquire accident information, traffic information, weather information, time information, etc.

The analyzing section 120 may be operable to communicate with the acquiring section 110, and to analyze the map data to divide the map area into the plurality of regions. The analyzing section 120 may analyze route information included in the map data. The analyzing section 120 may analyze route information indicating the number of roads, traffic lights, railroad crossings, or the like, the type of roads, the number of lanes in each road, and the speed limit on each road, for example.

The dividing section 130 may be operable to communicate with the analyzing section 120, and to divide the map area into a plurality of regions. The dividing section 130 may divide the map area such that the loads of the subsystems 200 managing their respective regions are substantially uniform. The dividing section 130 may divide the map area such that the number of roads, traffic lights, railroad crossings, and the like in a single region is no greater than a threshold amount. Furthermore, the dividing section 130 may divide the map area such that the length of a type of road, e.g. a highway or a road only for automobiles, in a single region, is no greater than a threshold length. The dividing section 130 may divide the map area such that the length of roads having a certain number of lanes or speed limit in a single region is no greater than a threshold length.

The region manager 140 may be operable to store information concerning the plurality of regions resulting from the division. The region manager 140 may be operable to specify the subsystem 200 managing the region that includes the position of the moving object 10, according to the position of the moving object 10. The region manager 140 may be operable to adjust the loads of the plurality of subsystems 200 by dynamically changing the boundary of at least one of the plurality of regions. The region manager 140 may adjust the loads of the subsystems 200 by changing the boundary of a region managed by a subsystem 200 whose load is relatively higher than the loads of the other subsystems 200. The region manager 140 may be realized by one or more servers. The region manager 140 includes a memory unit 142, a boundary managing section 144, and a determining section 146.

The memory unit 142 may be operable to communicate with the dividing section 130 and store information concerning the plurality of regions resulting from the division by the dividing section 130. The memory unit 142 may store setting values or the like of the system 100. The memory unit 142 may store intermediate data, calculation results, threshold values, parameters, and the like that are generated by or used in the operations of the system 100. In response to a request from any component within the system 100, the memory unit 142 may supply the data stored therein to the component making the request. The memory unit 142 may be a computer readable storage medium such as an electric storage device, a magnetic storage device, an optical storage device, an electromagnetic storage device, or a semiconductor storage device.

The boundary managing section 144 may be operable to communicate with each of the subsystems 200 and change the boundary of the region being managed by at least one of the subsystems 200. The boundary managing section 144 may be operable to change the boundary of the region according to information such as the moving objects 10, the routes, and events occurring in each region managed by a subsystem 200 or according to information about the subsystems 200. The boundary managing section 144 may provide instructions for changing the boundary of one or more subsystems 200 adjacent to the boundary being changed. The boundary managing section 144 may communicate with the memory unit 142 and update the boundary information of the region(s) of which the boundary was changed.

The determining section 146 may be operable to communicate with the memory unit 142 and determine the subsystem 200 that is to manage the moving object 10 from the position information of the moving object 10, based on the information of the plurality of regions. The determining section 146 may identify a position in the map area managed by the system 100 that corresponds to the position information of the moving object 10, and determine the subsystem 200 that manages the region including the identified position in the map area to be the subsystem 200 for managing this moving object 10. The determining section 146 may store the position information of this moving object 10 and/or the determined subsystem 200 in the memory unit 142, in association with this moving object 10. The determining section 146 may store a history of the position information of this moving object 10 and/or the determined subsystem 200 in the memory unit 142.

Each of the boundary managing section 144, and determining section 146, may be a circuit, a shared or dedicated computer readable medium storing computer readable program instructions executable by a shared or dedicated processor, etc.

The receiving section 150 may be operable to receive information transmitted from each of a plurality of moving objects 10. Each moving object 10 may transmit information at designated time intervals, and the receiving section 150 may sequentially receive this transmitted information. The receiving section 150 may receive position information of the moving objects 10 and event information observed by the moving objects 10. The receiving section 150 may be operable to receive, as position information, observation information of a moving object 10 that is observed by other moving objects 10. The position information may be information that represents longitude and latitude in an absolute coordinate system, distance and direction from a reference point, etc. The position information may include height (altitude) information. The receiving section 150 may acquire the absolute position information or relative position information of the moving object 10.

The receiving section 150 may receive an observation position observed by the moving object 10 using GPS. The receiving section 150 may receive the observation information detected by the moving object 10 using a geomagnetic sensor, for example. The receiving section 150 may communicate with the plurality of moving objects 10 and receive the position information of each moving object 10, via the Internet 40. The receiving section 150 may receive the position information of the plurality of moving objects 10 through wireless communication, a subscriber network, a cellular network, or any desired combination of networks.

The transmitting section 152 may be operable to transmit event information to each of the moving objects 10 according to settings, for example. The transmitting section 152 may transmit information concerning the route on which the moving object 10 is expected to travel. The transmitting section 152 may communicate with the moving objects 10 and transmit each type of information to the moving objects 10 via the Internet 40. The transmitting section 152 may transmit each type of information to the moving objects 10 through wireless communication, a subscriber network, a cellular network, or any desired combination of networks.

The gateway apparatus 160 may be operable to transfer communication between the plurality of subsystems 200 and the plurality of moving objects 10. The gateway apparatus 160 may communicate with the receiving section 150 and receive the information transmitted by each moving object 10. The gateway apparatus 160 may communicate with the region manager 140 and request from the region manager 140 the transfer destination for each piece of information received from the moving objects 10. In response to this request, the gateway apparatus 160 may receive from the region manager 140 the information of the subsystem 200 that is to manage the moving object 10 that transmitted the information. The gateway apparatus 160 may transfer the information received from the moving object 10 to the subsystem 200 that is to manage the moving object 10. In other words, the gateway apparatus 160 may transfer the information received from each moving object 10 to the subsystem 200 determined by the region manager 140.

The gateway apparatus 160 may communicate with each of the subsystems 200 and receive the information transmitted by each subsystem 200. The gateway apparatus 160 may communicate with the transmitting section 152 and supply the transmitting section 152 with the information received from each subsystem 200, such that this information is transferred to the moving objects 10 designated for each subsystem 200.

The gateway apparatus 160 may include a plurality of gateways, and may quickly perform transfer between the plurality of subsystems 200 and the plurality of moving objects 10. In this case, the receiving section 150 may function as a load balancer that supplies the information from the moving objects 10, such that the load is spread among the plurality of gateways. The load balancer may sequentially supply information from the moving objects 10 to the gateways having lighter loads. The gateway apparatus 160 may be a network that provides a connection between a plurality of networks using the same or different types of protocols.

The monitoring section 170 may be operable to monitor the loads of each of the subsystems 200. The monitoring section 170 may be further operable to monitor the performance indicator of each subsystem 200. The performance indicator may factor in capacity information, such as the capacity of a system processor, memory, storage, network communication, etc., system load information, such as utilization rate of a processor, memory, network, etc., regional load information, such as the number of each type of agents, the number of events occurred, the number of links/nodes within a region, the number of cross-region links, dynamic information within a map, or presence or absence of an administrative boundary. The system load information may be set to a target output value while the regional load information is variable. The monitoring section 170 may communicate with the plurality of subsystems 200 and monitor the amount of traffic, the number of moving objects 10, the number of events, the number of roads, and the like in the map area managed by the subsystems 200. The monitoring section 170 may monitor the amount of data processed by each subsystem 200 and the amount of data transmitted and received by each subsystem 200. The monitoring section 170 may monitor the amount of heat generated by each subsystem 200 and the amount of memory used by each subsystem 200. The monitoring section 170 may communicate with the region manager 140 and supply the monitoring results to the region manager 140. The monitoring section 170 may monitor the statistic information stored in the statistic information storage 175.

The statistic information storage 175 may be operable to store statistic information, which may include historical data. More specifically, statistic information storage 175 may communicate with the boundary managing section 144, the monitoring section 170, and the division calculation module 190, and collect information concerning system monitoring information, the number of agents of various types, the number of events occurred, the number of links between the regions in a map, dynamic information within a map, etc., and record them as statistical information. In the statistic information storage 175, capacity information of a CPU, memory, network volume, etc., system load information including utilization rate of a CPU, memory, etc. of a subsystem 200, and regional load information, such as a number of mobile objects in a corresponding region of a subsystem 200, a number of events occurring in the corresponding region, a number of routes in the corresponding region, a number of routes crossing a boundary of the corresponding region, etc., may be measured and stored in a timeline, and the storage may be configured to enable reference of the statistic information at any point in the past or within any span of time in the past. In response to a request from the division calculation module 190, the monitoring section 170, etc., the statistic information storage 175 may supply the data stored therein to the component making the request. The statistic information storage 175 may be a computer readable storage medium such as an electric storage device, a magnetic storage device, an optical storage device, an electromagnetic storage device, or a semiconductor storage device.

The control device 180 displays a graphical interface showing the geographical space, its regions, system resources, server topologies, etc., and accepts input for requesting information, boundary modification, resource allocation, performance indicator functions, etc. The control device may receive information, such as alerts, from monitoring section 170, and may receive information for displaying the geographical space from division calculation module 190. The control device may send information, such as performance indicator functions, candidate sets of constraint values, selections of candidates, etc., to the division calculation module 190. The control device 180 may be any device capable of displaying a graphical interface and accepting input, such as a personal computer, a tablet computer, a smart phone, etc.

The division calculation module 190 may be operable to receive information, such as the system load information, stored in the statistic information storage 175, and to calculate a boundary of a region to be assigned to each subsystem 200, based on a performance indicator of each subsystem 200. The performance indicator may be calculated from a performance indicator function set by a user through the control device 180, and the performance indicator function may be designated so that the system load of each subsystem does not exceed a performance threshold. The division calculation module 190 may calculate a configuration of lines and points to form a border of each region by use of an optimal technique, such as linear programming, non-linear programming, dynamic programming, multi-objective optimization, etc., to satisfy an index (objective function) designated by a user based on the information stored in the statistical information database. The division calculation module may receive information, such as current region boundaries, from the boundary managing section 144, and may send information, such as boundary modifications, to the boundary managing section 144.

Each of the acquiring section 110, analyzing section 120, dividing section 130, gateway apparatus 160, receiving section 150, transmitting section 152, monitoring section 170, and division calculation module 190 may be a circuit, a shared or dedicated computer readable medium storing computer readable program instructions executable by a shared or dedicated processor, etc. The circuits, computer-readable mediums, and/or processors may be implemented in shared or dedicated servers.

The subsystems 200 may be operable to respectively perform data processing relating to traffic of the plurality of regions obtained by dividing the geographic space including routes on which mobile objects 10 move. Each subsystem 200 may manage the moving objects 10 positioned within the corresponding management target region, from among the plurality of moving objects 10. Each subsystem 200 may set one of the regions resulting from the division as a management target region, and may manage the mapping of the moving objects 10 that are management targets on a map of this management target region. Each subsystem 200 may be operable to manage events occurring within the corresponding management target region, and may manage mapping of these events on the map of this management target region.

Each subsystem 200 may begin data processing relating to a moving object 10 that is a new management target, in response to the region manager 140 changing the boundary of the management target region. In this case, in response to the change of the boundary, the subsystem 200 for which a new management target, e.g. a map, a moving object 10, an event, etc., has been generated may receive the information concerning this management target from the subsystem 200 that was managing this management target prior to the boundary change. Each subsystem 200 may stop managing the information of a management target in response to receiving information indicating the exclusion of the management target, or in response to supplying information indicating the addition of the management target to another subsystem 200, which may be due to the region manager 140 changing the boundary of the management target region. Each subsystem 200 includes a managing section 210 and an identifying section 220.

The managing section 210 provided in one subsystem 200 may manage the route information of the region managed by this subsystem 200, i.e. individual route information. The identifying section 220 provided in one subsystem 200 may identify the routes within the individual route information on which a moving object 10 is positioned, based on the position information received from the moving objects 10 in the region managed by this subsystem 200. In other words, the managing section 210 and the identifying section 220 may map the management target moving objects 10 on a map of the management target region, based on the position information received from the moving objects 10. The subsystem 200 may include a function known as LDM (Local Dynamic Map), by using the managing section 210 and the identifying section 220. Each of the managing section 210, and identifying section 220, may be a circuit, a shared or dedicated computer readable medium storing computer readable program instructions executable by a shared or dedicated processor, etc.

The system 100 of the present embodiment described above may manage a map area containing regions obtained by dividing a geographic space for a plurality of subsystems 200, along with moving objects 10 and events positioned within this map area. The region manager 140 dynamically changes the loads of the subsystems 200 by changing the boundary of at least one of the regions according to at least one of the data processing loads relating to the moving objects 10 and the number of moving objects 10 positioned in each of the regions, for example. In this way, the system 100 can prevent the loads placed on the servers among the subsystems 200 from exceeding the processing capacities of the servers. Furthermore, the system 100 can prevent a decrease in efficiency of the overall system due to a certain server among the subsystems 200 having an overwhelming load.

Figure 3:
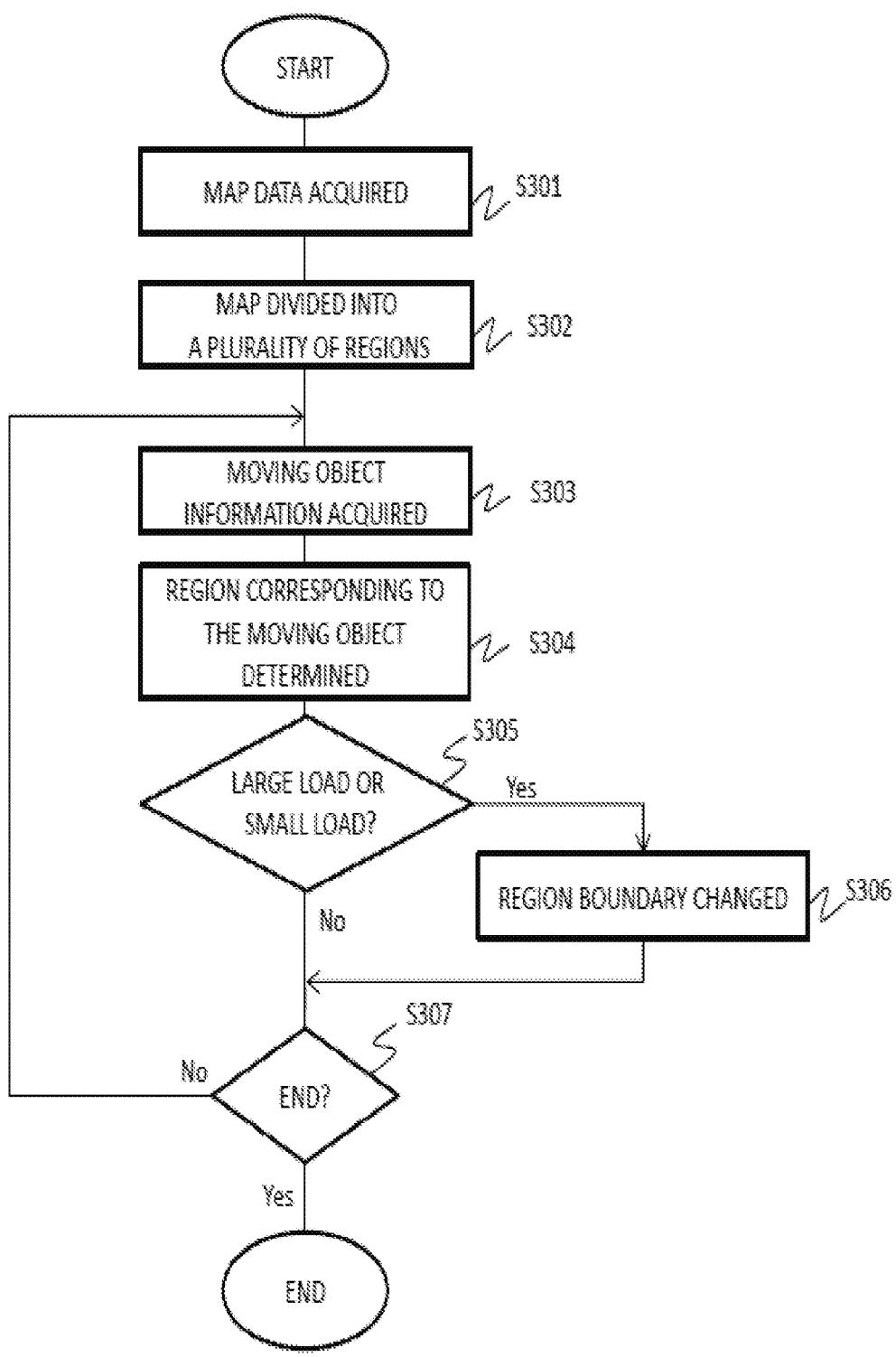
FIG. 3 shows an operational flow of a system, according to an embodiment of the present invention.

FIG. 3 shows an operational flow of a system, according to an embodiment of the present invention. The present embodiment describes an example in which the system performs operations from S301 to S307 shown in FIG. 3 to dynamically adjust the loads of the plurality of subsystems 200. FIG. 3 shows one example of the operational flow of the system 100 shown in FIG. 1, but the system 100 shown in FIG. 1 is not limited to using this operational flow, and the operational flow of FIG. 3 may be performed by other systems.

First, an acquiring section, such as the acquiring section 110, may acquire the map data of the geographic space to be managed by the system (S301). The acquiring section may acquire map data of a geographic space that includes one or more cities, one or more towns, and the like. The acquiring section may include map data of a geographic space including one or more states, countries, continents, etc.

Next, an analyzing section, such as the analyzing section 120, analyzes the acquired map area, and a dividing section, such as the dividing section 130, may divide the area of the map data (map area) according to this analysis (S302). The analyzing section may count the number of roads, the number of events, and the like in the map area. The analyzing section may analyze the map area by calculating the number of roads and the number of events per unit surface area. The dividing section may divide the map area into a plurality of regions according to the processing capability of a single subsystem. The dividing section may divide the map area into a number of regions that is less than the number of subsystems. The dividing section may store the information concerning the regions resulting from the division in a memory unit, such as the memory unit 142.

Next, a receiving section, such as the receiving section 150, may receive the information transmitted from each of a plurality of moving objects, such as moving object 10 (S303). The receiving section may receive the position information of each moving object. The receiving section may receive information concerning events observed by each of the moving objects, in addition to the position information. The receiving section may supply a gateway apparatus, such as the gateway apparatus 160, with the pieces of received information. The gateway apparatus may request the transfer destination of each piece of received information from the region manager.

Next, in response to the request from the gateway apparatus, the region manager may determine the regions in which the moving objects are positioned, based on the position information received from each of the moving objects, and may determine the subsystem for managing the maps of these regions from among a plurality of subsystems, such as the plurality of subsystems 200 (S304). Specifically, the region manager may determine each region in the map area in which a moving object is positioned, according to the position information of each moving object. The region manager may determine the subsystem to manage each determined region for each piece of position information, and provide notification to the gateway apparatus.

The gateway apparatus may transfer each piece of received information, with the subsystem corresponding to the position information as determined by the region manager serving as the transfer destination. The subsystems may each perform mapping of the received information on a map of the corresponding management target region. Specifically, each subsystem may map the management target moving objects that this subsystem manages, sequentially update the mapping according to position information sequentially transmitted from these moving objects, and manage the movement of these moving objects on the map.

Each subsystem may perform a search of a route from the position of a moving object on the map to a position where this moving object will arrive in the future. Each subsystem may search for a route to which the moving object is capable of moving in a threshold time, or may instead search for a route to a position on the map designated by the moving object or a recognized position, such as a landmark.

Each subsystem may map management target events on the map managed by this subsystem, and may transmit information concerning these events to the moving objects, according to settings or the like. In this way, the subsystems can notify a moving object of information concerning events occurring at positions near the position of the moving object. The subsystems can notify each moving object about information concerning the route relating to the movement direction of the moving object. The subsystems may provide an application that operates independently from the system with the position information, event information, route information, and the like of each moving object.

A monitoring section, such as the monitoring section 170, may monitor each of the subsystems and supply the region manager with the monitoring results. The region manager may determine whether or not the load placed on each subsystem is large (or small) (S305). Here, the region manager may determine whether the load placed on each subsystem is small. The region manager may determine whether or not the load of one subsystem is relatively large (or relatively small) compared to the other subsystems.

The region manager may determine whether or not the load of each subsystem is greater than (or less than) a threshold load. The region manager may determine whether or not the load placed on each subsystem is larger than a threshold load, in order of load size, beginning with the subsystem having the largest load. The region manager may determine whether or not the load placed on each subsystem is smaller than a threshold load, in order of load size, beginning with the subsystem having the smallest load.

The region manager may determine whether or not the load of one subsystem is both larger than the load of another subsystem and larger than a threshold load. The region manager may determine whether or not the load of one subsystem is both smaller than the load of another subsystem, and smaller than a threshold load. The region manager may determine whether to change the boundary of a region managed by a subsystem, according to the determination of the size of the load of this subsystem.

The region manager determines, for each region, whether to change the boundary of the region according to the number of moving objects in the region, the data processing load relating to the moving objects, the data processing load on the subsystem, the data processing load on the server, etc. The region manager may determine, for each region, whether to change the boundary of the region according to the number of events occurring in the region, the data processing load relating to these events, the data processing load on the subsystem, the data processing load on the server, etc.

The plurality of subsystems may calculate the complexity of the route network in each of the regions, and, according to the complexity, the region manager may determine whether to change the boundary of the corresponding region. In this case, if a plurality of subsystems have performed the route search, then the plurality of subsystems may calculate the complexity of the route network based on a history of the processing loads of the route searches performed in each of the regions. The region manager may determine, for each region, whether to change the boundary of the region according to the amount of traffic of the moving objects in the region. In this case, for each region, the region manager may determine whether to change the boundary of the region according to the amount of traffic of the moving objects moving between this region and the adjacent regions.

If the load of one or more of the subsystems is determined to be large or small (S305: Yes), then the region manager may change the boundary of the region managed by the subsystem having a load determined to be large or small (S306). The region manager may change the boundary of at least one region to decrease (or increase) the number of moving objects positioned within a partial region next to the boundary, the data processing load relating to those moving objects, etc. For example, the region manager balances the loads by changing the boundary of a region with a large load and transferring management of a portion of this region that has a large number of moving objects and/or a large data processing load relating to these moving objects to an adjacent region.

The region manager may change the boundary of at least one region to decrease (or increase) the number of events occurring within a range in the region, the data processing load relating to these events, etc. For example, the region manager balances the loads by changing the boundary of a region with a large load, and transferring management of a portion of this region that has a large number of events and/or a large data processing load relating to these events to an adjacent region.

The region manager may change the boundary of at least one region to decrease (or increase) the complexity of the route network within the region. For example, the region manager balances the loads by changing the boundary of a region with a large load, and transferring management of a portion of this region that has a highly complex route network to an adjacent region.

If a boundary of a region is positioned in the midst of a route portion where the traffic amount exceeds a predetermined reference traffic amount, then the region manager may change the boundary of the region such that the entire route portion is included in one of the adjacent regions. For example, the region manager balances the loads by changing the boundary of a region with a large load, and transferring management such that the entire route portion of this region that includes the route portion where the traffic amount exceeds the reference traffic amount is included in an adjacent region.

The region manager may change the boundary of a region such that the amount of traffic passing across the boundary of the region decreases. For example, the region manager may exclude or disqualify any boundary change candidate that is expected to cause the amount of traffic of moving objects crossing the boundary to increase relative to the amount of traffic crossing the boundary before the boundary of the region is changed. For example, the region manager may exclude or disqualify a boundary change candidate where the boundary would cross through a town from the boundary change candidates.

The region manager may change the boundary to a position expected to cause the traffic amount after the change to be less than the traffic amount of the moving objects crossing the boundary before the boundary of the region is changed. For example, the region manager may change the boundary such that the number of routes crossing the boundary is smaller than before the change, or may change the boundary such that smaller routes and routes with fewer curves cross the boundary than before the change.

In the manner described above, for each of the plurality of subsystems, the region manager may determine the magnitude of the load and adjust the balance of the loads. If it is determined that none of the loads of the subsystems are large or small (S305: No), then the region manager need not change the boundary of a region. In other words, the region manager may allow the subsystems to continue management with loads within a suitable range.

Next, the system may determine whether instructions have been received to suspend or stop operation (S307). If the program has ended, instructions have been received from the user of the system, or an emergency stop has occurred, for example (S307: Yes), then the system may end the operation.

If instructions for suspending or stopping the operation have not been received, then the system may return to the operation of S303 for receiving information from the moving objects and continue managing the subsystems. Until receiving instructions to suspend or stop the operation, the system may repeatedly perform the operations from S303 to S307 to continue the management of the subsystems while adjusting the loads of the subsystems.

In the manner described above, the system according to the present embodiment dynamically changes the boundaries of the regions managed by the subsystems, according to, for example, the load of each of the subsystems, and can therefor handle dynamic changes in events and the number of moving objects. For example, in response to the load of one subsystem becoming large, the system changes the boundary of the region managed by this subsystem in a manner that decreases the surface area of this region, and can therefore dynamically adjust the balance of the loads among the subsystems. Furthermore, in response to the load of one subsystem becoming small, the region manager may change the boundary of the region managed by this subsystem to increase the surface area of this region, and can therefore adjust the balance of the loads among the subsystems.

In this way, the system can manage the geographic space without exceeding the processing capabilities of the subsystems, and can prevent a decrease in efficiency of the overall system caused by an overwhelming load on a certain subsystem. Furthermore, the system changes the boundary of at least one region such that the amount of traffic crossing the border of this region managed by a subsystem decreases, and can therefore decrease the number of times that data is exchanged among the subsystems, thereby also decreasing the amount of data that is exchanged. In other words, even if the geographic space is increased, the system prevents an overwhelming load on a certain subsystem, and efficiently processes data with the plurality of subsystems operating in a loosely coupled manner, and can therefore handle a large geographic space encompassing one or more states, countries, continents, etc.

Figure 4:
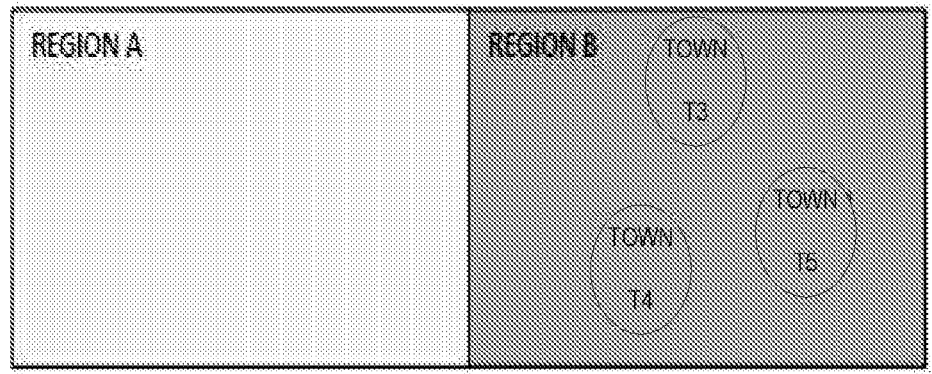
FIG. 4 shows an example of a map area divided by a dividing section, according to an embodiment of the present invention.

A first example in which the system balances the loads of two subsystems is described below using FIGS. 4 to 6. FIG. 4 shows an example of a map area divided by a dividing section, such as the dividing section 130, according to an embodiment of the present invention. FIG. 4 shows an example of the result of an operation of dividing a map area, such as S302 of FIG. 3. FIG. 4 shows an example in which the map area is divided into region A and region B. A first subsystem manages region A, and a second subsystem manages region B.

The first subsystem may manage the routes in region A, the events occurring in region A, and the moving objects moving on the routes in region A. The first subsystem may receive information of a moving object that has moved from region B to region A, from the second subsystem, and begin management of the moving object. The first subsystem may supply the second subsystem with information of a moving object that has moved from region A to region B, and transfer the management of the moving object. Region A includes a town T1 and a town T2, and region B includes a town T3, a town T4, and a town T5.

Figure 5:
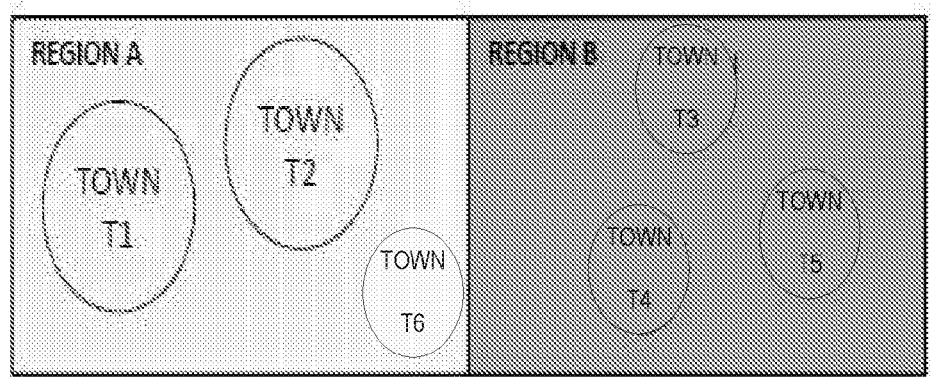
FIG. 5 shows an example of a case in which the load of one subsystem has increased, according to an embodiment of the present invention.
Figure 6:
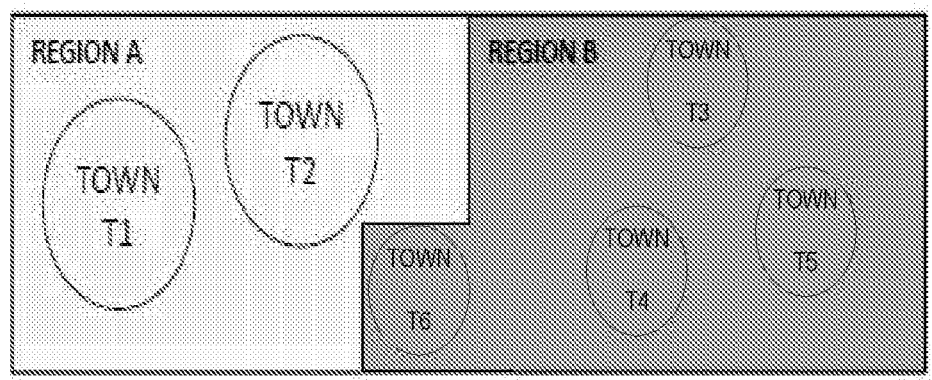
FIG. 6 shows an example of region boundaries changed by the region manager, according to an embodiment of the present invention.

FIG. 5 shows an example of an increased load of one subsystem, according to an embodiment of the present invention. City development has progressed in region A, and a town T6 has been formed. In this way, since a new town T6 has formed, the routes in region A and the number of moving objects moving in region A have increased. In such a case, the load of the first subsystem managing region A increases relative to the load of the second subsystem. If this happens, then the processing load on the first subsystem increases, and causes the load to exceed the processing capability of the first subsystem.

The system of the present embodiment may change the boundary of region A according to the load of the first subsystem. Specifically, a region manager, such as the region manager 140, may change the boundaries of region A and region B according to the monitoring results of the loads of the first and second subsystems from a monitoring section, such as the monitoring section 170. In this case, the region manager may instruct the first subsystem to change the boundary such that the partial region including the town T6 in region A is removed from region A, and may instruct the second subsystem to change the boundary such that the partial region including the town T6 in region A is added to region B.

According to the instructions from the region manager, the first subsystem may supply the second subsystem with information of the portion of region A including the town T6, and stop management of this region portion. According to the instructions from the region manager, the second subsystem may receive the information of the portion of region A including the town T6 from the first subsystem, and begin management of this portion. FIG. 6 shows an example of region boundaries changed by the region manager, according to an embodiment of the present invention. In this way, the system according to the present embodiment can prevent processing from overwhelming the first subsystem, and can prevent the load from exceeding the processing capability of the first subsystem.

Figure 7:
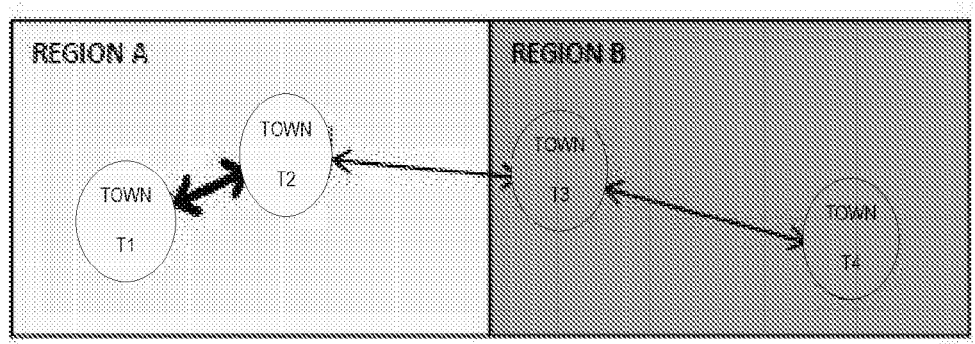
FIG. 7 shows an example of a map area that is divided by the dividing section, according to an embodiment of the present invention.

A second example in which the system adjusts the balance of loads between two subsystems is described below using FIGS. 7 to 9. FIG. 7 shows an example of a map area that is divided by a dividing section, such as the dividing section 130, according to an embodiment of the present invention. FIG. 7 shows an example of a result of an operation of dividing a map area, such as S302 of FIG. 3. FIG. 7 shows an example in which the map area is divided into region A and region B. A first subsystem manages region A, and a second subsystem manages region B.

The first subsystem may manage the routes in region A, the events occurring in region A, and the moving objects moving on the routes in region A. The first subsystem may receive information of a moving object that has moved from region B to region A, from the second subsystem, and begin management of the moving object. The first subsystem may supply the second subsystem with information of a moving object that has moved from region A to region B, and transfer the management of the moving object.

Region A includes a town T1 and a town T2, and region B includes a town T3 and a town T4. The traffic amount, which is the amount of moving objects, between the town T1 and the town T2 is greater than the traffic amount between the town T3 and the town T4. Furthermore, the traffic amount between the town T2 and the town T3 is approximately equal to the traffic amount of between the town T3 and the town T4.

Figure 8:
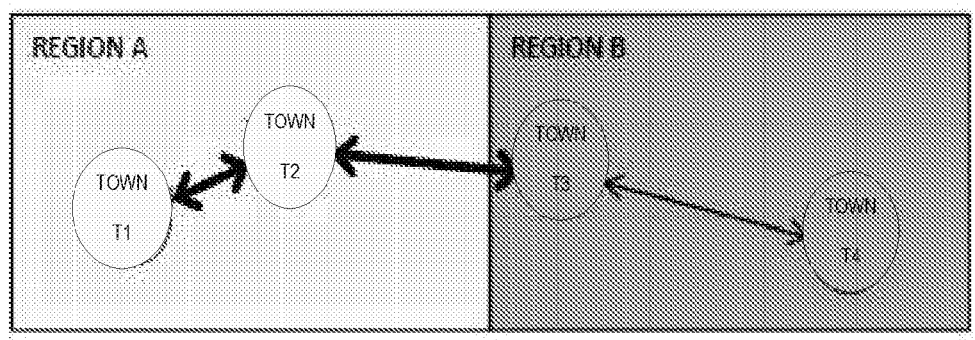
FIG. 8 shows an example of a case in which the loads of two subsystems have increased, according to an embodiment of the present invention.
Figure 9:
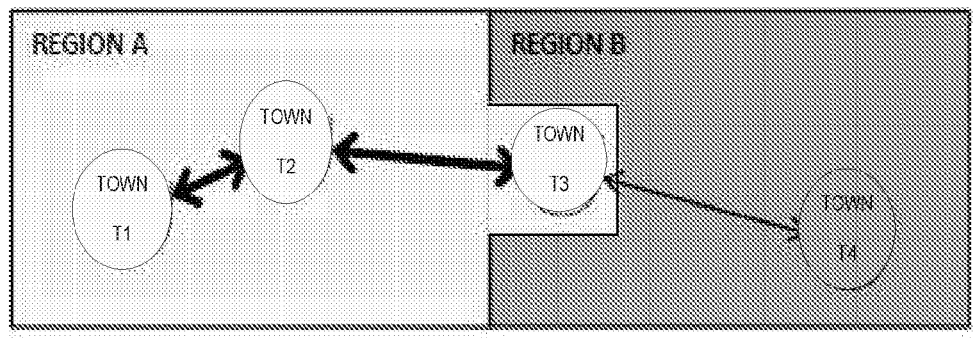
FIG. 9 shows an example of a boundary of a region changed by the region manager, according to an embodiment of the present invention.

FIG. 8 shows an example of a case in which the loads of two subsystems are increased, according to an embodiment of the present invention. FIG. 8 shows an example in which road development between the town T2 and the town T3 has progressed, and the traffic amount between the town T2 and the town T3 has increased relative to the traffic amount between the town T3 and the town T4.

In this embodiment, the traffic amount between region A and region B has increased, and therefore the amount of data exchanged between the first subsystem and the second subsystem has increased. The improvement of the road infrastructure and development of each town may have caused the processing to be increased on the first subsystem and/or the second subsystem, or cause the loads of the first subsystem and/or the second subsystem to exceed their processing capabilities.

If a boundary is positioned in a region in the midst of a route portion where the traffic amount exceeds a predetermined reference traffic amount in this manner, then the system may change the boundary of this region to include the entirety of this route portion in one of the adjacent regions. In this embodiment, a region manager, such as the region manager 140, may change the boundaries of region A and region B in response to the monitoring results of a monitoring section, such as the monitoring section 170, indicating that the traffic amount between the town T2 and the town T3 has exceeded the reference traffic amount. In this embodiment, the region manager may instruct the first subsystem to change the boundary such that the entire route between the town T2 and the town T3 is included as a new management target in region A, and may instruct the second subsystem to change the boundary such that the entire route between the town T2 and the town T3 is no longer included as a management target.

The ranges around the town T2 and the town T3 often include complex routes, and therefore the region manager may change the boundaries of the regions in a manner to avoid these ranges, or to minimize changes outside of the route between the town T2 and the town T3. The region manager may set the town T2, the town T3, and the route connecting the town T2 and the town T3 as management targets of the first subsystem (or the second subsystem).

In response to the instructions from the region manager, the second subsystem may supply the first subsystem with the information of the portion of region B including the town T3 and the route connecting the town T2 and the town T3, and may stop management of this region portion. In response to the instructions from the region manager, the first subsystem may receive from the second subsystem the information of this portion of region B, and may begin managing this region portion. In other embodiments, the second subsystem may continue to manage a transferred region portion until the first subsystem begins to manage the transferred region portion. This ensures that no portion is unmanaged at any time. FIG. 9 shows an example of a boundary of a region changed by a region manager, such as the region manager 140, according to an embodiment of the present invention. In this way, the system may prevent an increase in the amount of information exchanged among the plurality of subsystems.

The system may change the management target regions managed respectively by the subsystems, according to the respective loads of the subsystems. The system 100 may also divide or combine the management target regions according to the respective loads of the subsystems.

For example, if the load of a first subsystem is high, and the load of a second subsystem of an adjacent region to the region of the first subsystem cannot handle any more load, the region manager may divide the first subsystem into two.

In this case, the region manager may cause the first subsystem to manage one of the regions resulting from the division, and transfer the management of the other region resulting from the division to a subsystem having no region allocated thereto.

If the loads of two subsystems of adjacent regions are low, and combining the management target regions of these two subsystems would result in a load that could be managed by a single subsystem, then the region manager may combine these two management target regions into one. In this case, the region manager may cause one of the two subsystems to manage the one management target region resulting from the combination, and may remove the region allocation from the other subsystem. In this way, the system may adjust the loads of the subsystems by dividing or combining the management target regions.

In the system, a dividing section, such as the dividing section 130, may divide the map area into a plurality of regions. The dividing section may divide the map area into a plurality of regions with designated shapes. The dividing section may divide the map area into regions with square or hexagonal shapes, for example, or into regions with a combination of a plurality of types of shapes. In embodiments where the dividing section divides the map area into regions with square or hexagonal shapes, for example, the boundaries of the regions may form a grid pattern or a honeycomb pattern.

If the map area is divided into shapes in this manner, then the system may further include a plurality of redundant regions with shapes that do not substantially match the shape of the regions resulting from the division. In this case, the dividing section may perform division while shifting the center or weighted center of each region relative to the center or weighted center of each redundant region, such that the regions and the redundant regions do not completely overlap. For example, if the map area is divided into a plurality of regions having a plurality of square shapes, then the dividing section may provide redundant regions that resemble these square shapes. The dividing section may provide the centers of these square redundant regions at positions matching the vertices of the square regions. The subsystems may respectively manage these redundant regions.

In this way, if a moving object moves near the vertex of a region or moves in a serpentine route near a vertex, even though the moving object moves between regions, the moving object is moving at a position near the center of the redundant region including this vertex. Accordingly, even though a moving object moves in a manner that would cause information to be exchanged a plurality of times between a plurality of subsystems, the system can decrease the number of information exchanges by using a subsystem to manage the redundant region.

The system dynamically changes the boundary of a region managed by a subsystem, according to the load of the subsystem. In the above description, as a result of changing the boundary, due to an increase of the management target region, the subsystem receives information of this increased region from the subsystem that has previously managed this region. In addition, each of the subsystems may manage at least a portion of the data processing relating to a moving object positioned within a range from the boundary with an adjacent management target region, in parallel with the subsystem that manages this adjacent region.

In this way, each subsystem manages a region that has been expanded in advance, and therefore if the boundary of a region is dynamically changed, then management of the transferred region portion can begin immediately without immediately exchanging information with another subsystem. Furthermore, after a boundary is changed and management of the transferred region portion has begun, the subsystem may receive information of the transferred region portion from another subsystem. In this way, the system can spread out the exchange of information among the subsystems over time, thereby preventing temporary increases in the processing of a subsystem.

Figure 10:
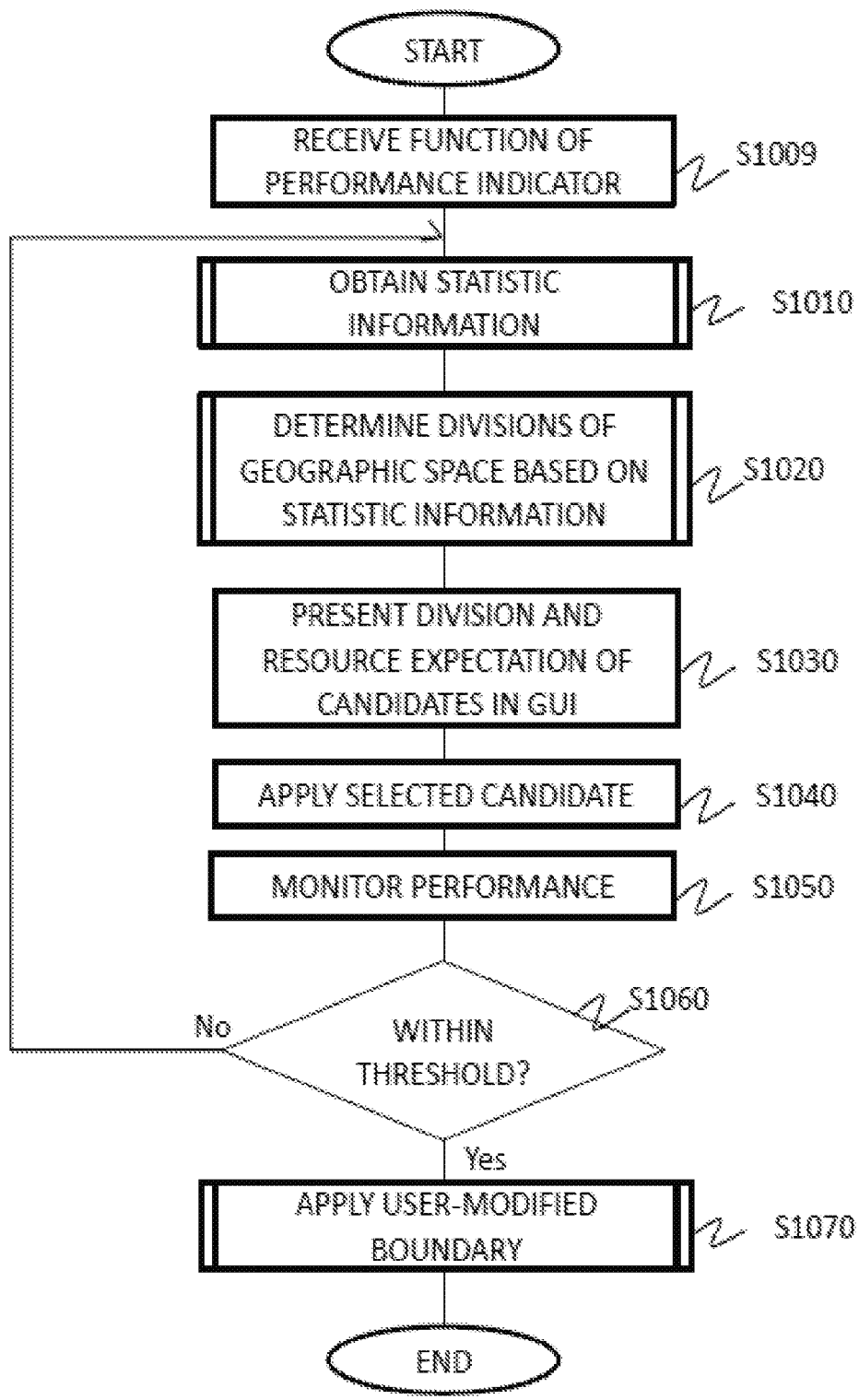
FIG. 10 shows an operational flow for dividing a geographical space, according to an embodiment of the present invention.

FIG. 10 shows an operational flow for dividing a geographical space, according to an embodiment of the present invention. The present embodiment describes an example in which the system performs operations from S1009 to S1070 to divide a geographical space. FIG. 10 shows one example of the operational flow of the system 100 shown in FIG. 2, but the system 100 shown in FIG. 2 is not limited to using this operational flow, and the operational flow of FIG. 10 may be performed by other systems.

At S1009, a performance indicator function is received from a control device, such as control device 180. The performance indicator function is a formula, such as a mathematical formula, to determine a score of each cell based on statistic information. The performance indicator function can be designed by a user by using variables that each represent one statistic of all or one cell or region, and the constrained values. For example, if a user would like to balance average loads of each server, then the user can define a performance indicator function that outputs higher value for even distribution of loads among servers. The performance indicator function can be a linear function of variables having a user-defined weight, or a higher order function. Among the variables that may be used in designing the performance indicator function are capacity information, such as the capacity of a system processor, memory, storage, network communication, etc., system load information, such as utilization rate of a processor, memory, network, etc., regional load information, such as the number of each type of agents, the number of events occurred, the number of links/nodes within a region, the number of cross-region links, dynamic information within a map, or presence or absence of an administrative boundary. The system load information may be set to a target output value while the regional load information is variable. At S1010, a division calculation module, such as division calculation module 190, obtains statistic information from a statistic information storage, such as statistic information storage 175. At S1020, the division calculation module determines one or more divisions of the geographical space based on the statistic information and performance objectives. At S1030, the division calculation module presents each division in a graphical user interface on a display of the control device. At S1040, the control device receives a division selection from input, such as by a user, and a boundary managing section, such as boundary managing section 144, applies the selected division. A region manager, such as region manager 140, may be notified of the determined region boundaries by the boundary managing section, and may assign processes to each subsystem accordingly. At S1050, the performance of the system with the selected division is monitored by a monitoring section, such as monitoring section 170. At S1060, the monitoring section verifies that the performance of the system is consistent with the performance objectives used to determine the division. Even after the determination of the region boundaries, the performance indication of each subsystem may be constantly monitored by the monitoring section, and if the performance indicator exceeds the performance threshold for a certain amount of time, the load among the subsystems becomes imbalanced, or any other inconsistency with the performance objectives is realized, then the control device receives notification from the monitoring section, and one or more regional boundaries may be recalculated by the division calculation module upon receiving authorization for recalculating one or more regional boundaries from the control device. The control device may not send authorization for recalculating to the division calculation module until certain input is received by the control device, such as from a user. If the performance is consistent with the performance objectives, then the process continues to S1070. However, if the performance is not consistent with the performance objectives, then the process returns to S1010, and proceeds to determine new boundaries. For example, an update of the map information may lead to the regional load information increasing the number of links, and in response, the performance threshold is exceeded. At S1070, a user-modified boundary may be applied by the boundary managing section.

In other embodiments, the system may calculate a performance indicator, determine whether the performance indicator exceeds a performance threshold, determine a division of the geographic space that can improve the performance indicator, and recommend the division of the geographic space through a user interface of a control device. In some embodiments, the performance indicator remains below the performance threshold during required performance, but may exceed the performance threshold if the performance indicator increases too much, such as in response to the load increasing too much. In other embodiments, the performance indicator remains above the performance threshold during required performance, but may exceed the performance threshold if the performance indicator decreases too much, such as in response to the load increasing too much.

Figure 11:
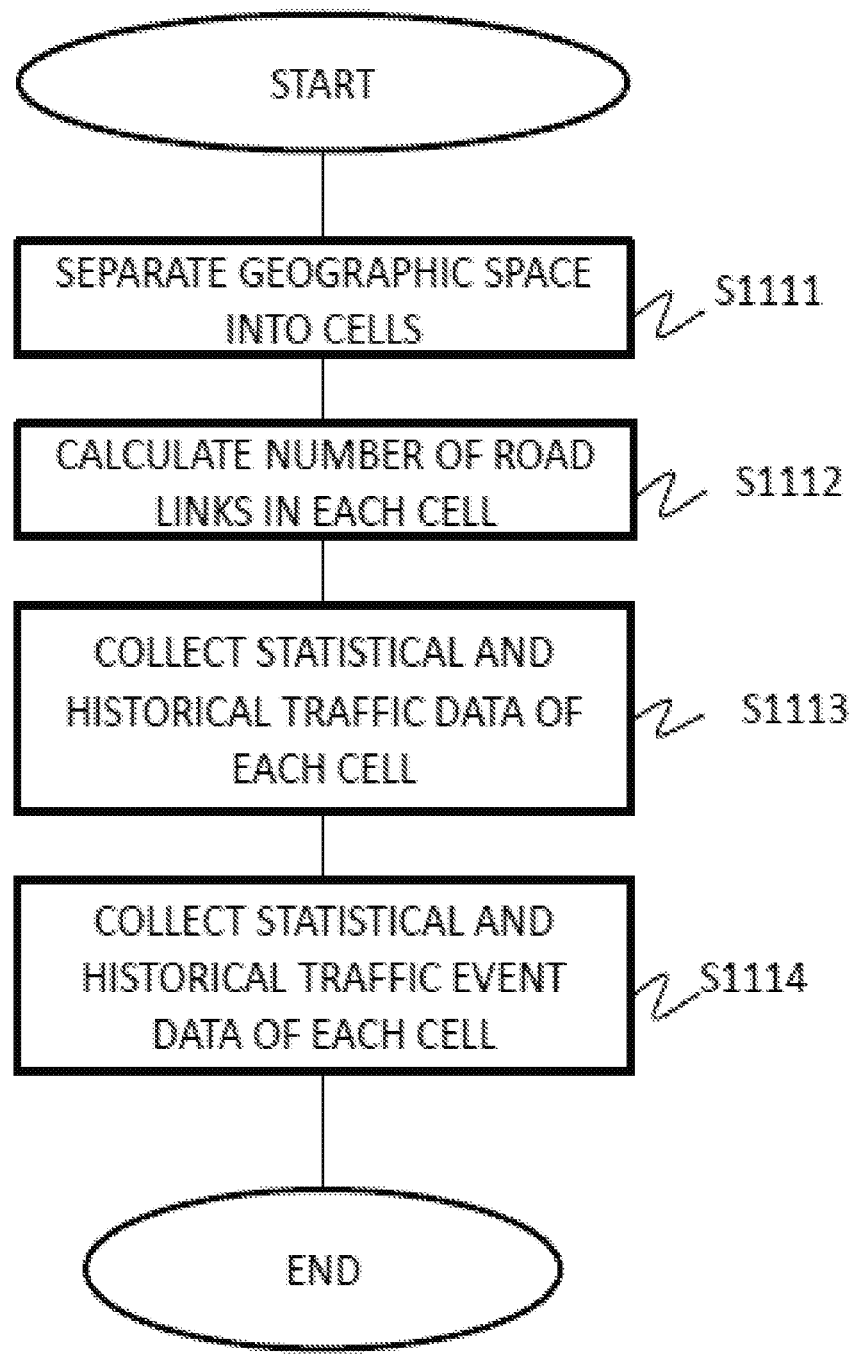
FIG. 11 shows an operational flow for obtaining statistic information of a geographical space, according to an embodiment of the present invention.

FIG. 11 shows an operational flow for obtaining statistic information of a geographical space, according to an embodiment of the present invention. The present embodiment describes an example in which the system performs operations from S1111 to S1114 to obtain statistic information of a geographical space, such as S1010 of FIG. 10 by collecting statistical data of a road network in the geographical space. FIG. 11 shows one example of the operational flow of the system 100 shown in FIG. 2, but the system 100 shown in FIG. 2 is not limited to using this operational flow, and the operational flow of FIG. 11 may be performed by other systems.

At S1111, a monitoring section, such as monitoring section 170, may separate the geographic space into cells. These cells may be much smaller than regions, such that each region encompasses hundreds of cells. At S1112, the monitoring section may calculate the number of road links in each cell, and assign the number of road links to each cell. At 51113, the monitoring section may collect statistical and historical data of vehicle traffic data. This data may come from a statistic information storage, such as statistic information storage 175, or directly from car probe data analysis. The monitoring section may calculate this data for each cell in the geographic space, and assign the data to each cell. At S1114, the monitoring section may collect statistical and historical data of traffic events. The monitoring section may calculate this data for each cell in the geographic space, and may assign the data to each cell. Once the monitoring section assigns each cell these data points, a division calculation module, such as the division calculation module 190, may begin a division determination.

Figure 12:
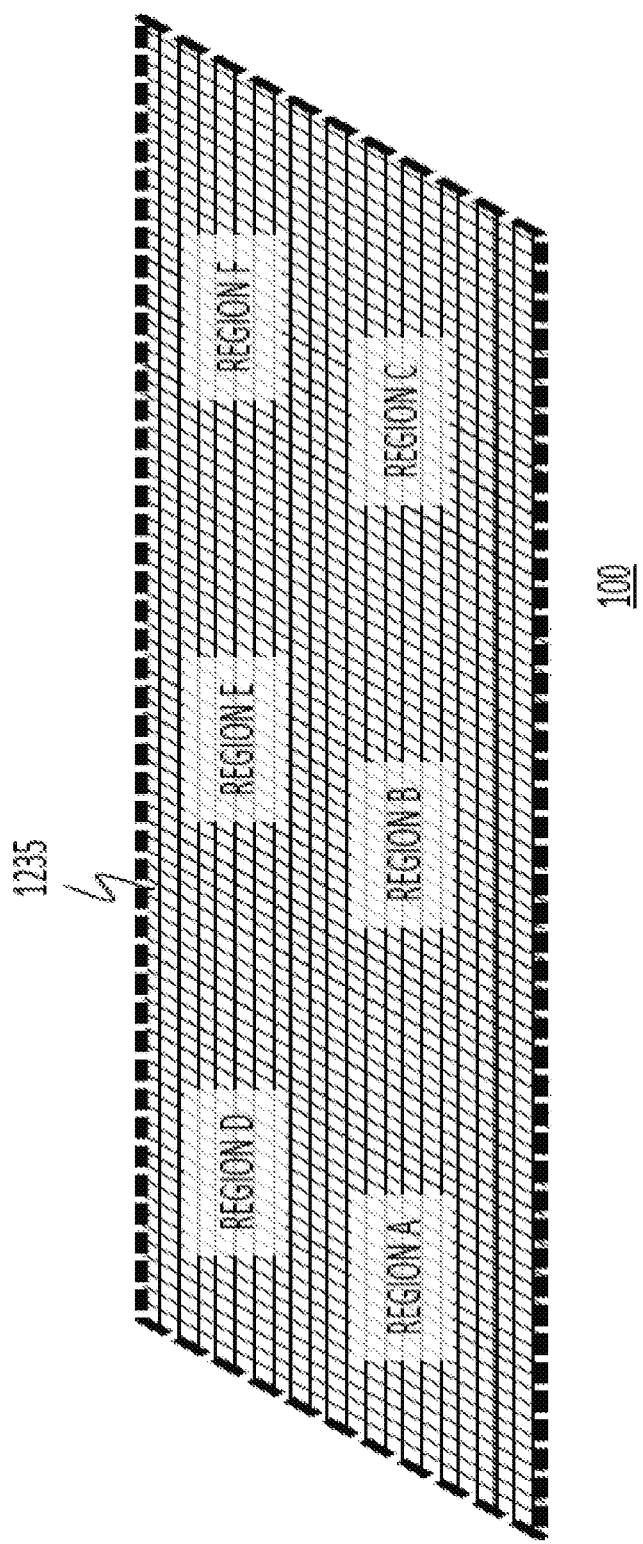
FIG. 12 shows a geographical space that has been separated into cells, according to an embodiment of the present invention.

FIG. 12 shows a geographical space that has been separated into cells, according to an embodiment of the present invention. As shown in FIG. 12, each cell, such as cell 1235, is much smaller than the region in which the cell is located. Statistic information may be obtained on a per cell basis, which may assist in the determination of optimal boundaries. The size of each cell may be varied according to processing capabilities and desired accuracy. Using smaller cells in the determination of boundaries may result in more accurate optimal boundaries, but may require more processing and/or memory capacity. Using larger cells in the determination of boundaries may result in less accurate optimal boundaries, but may require less processing and/or memory capacity. In some embodiments a control device, such as control device 180, may change the cell size in response to input from a user in a user interface displayed on the control device.

Figure 13:
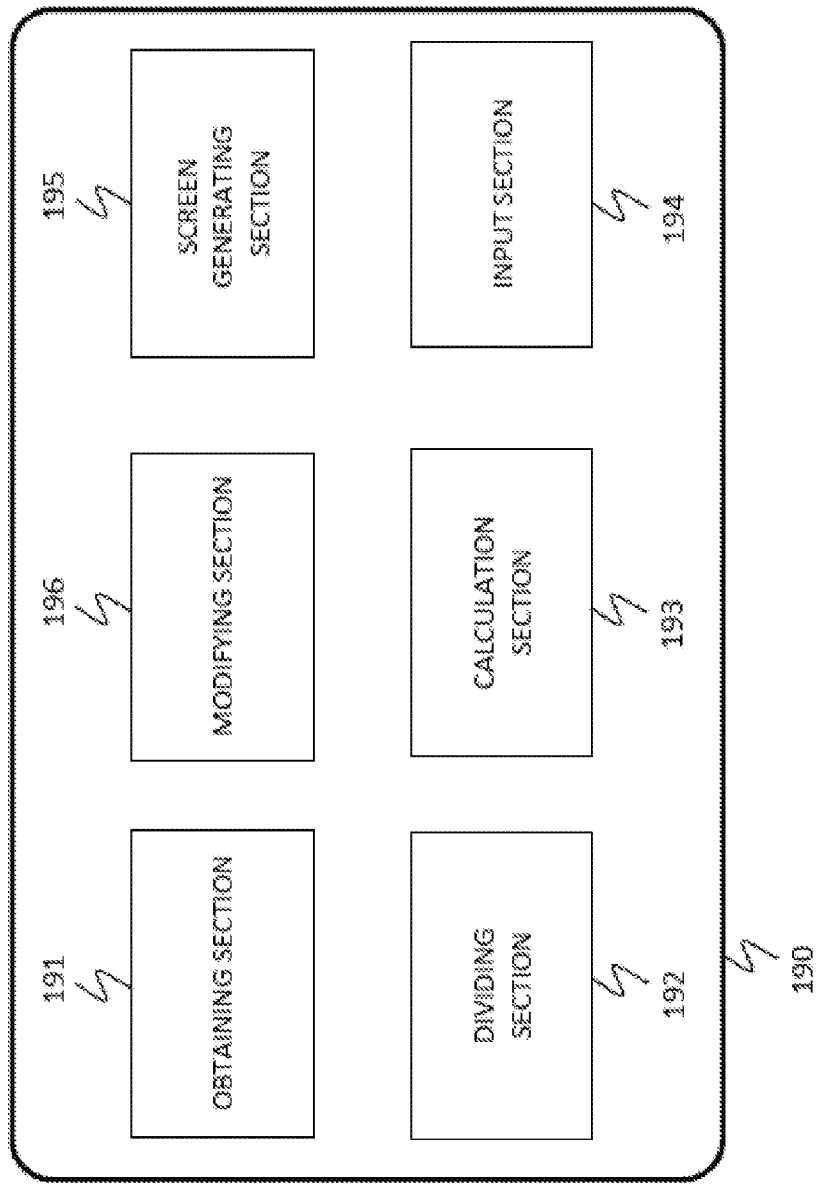
FIG. 13 shows a division calculation module, according to an embodiment of the present invention.

FIG. 13 shows a division calculation module 190, according to an embodiment of the present invention. The division calculation module 190 may include an obtaining section 191, a dividing section 192, a calculation section 193, an input section 194, a screen generating section 195, and a modifying section 196. The obtaining section 191 may obtain statistic information of at least one subsystem among the plurality of subsystems, the statistic information relating to a processing load of the at least one subsystem. The statistic information may then flow to the dividing section 192. The dividing section 192 may be operable to divide the geographic space into the plurality of regions based on the statistic information. The calculating section 193 may calculate a performance indicator of the at least one subsystem, wherein the performance indicator is a function of at least one statistics parameter included in the statistic information. The input section 194 may be operable to receive the function of the performance indicator from a control device, such as control device 180, through a user interface. However, if a function of the performance indicator is already accessible by the calculating section 193, then the calculating section 193 may use the accessible function. The input section 194 may be further operable to receive a modification request from a control device through a user interface, wherein the modification request includes a request to modify a boundary of a region among the plurality of regions. The screen generating section 195 may be operable to generate a screen image showing a map of the geographic space, a boundary of each region, and a performance indicator of each region. For example, the performance indicator(s) calculated by the calculating section 193 may be shown on the map in the screen image. The modifying section 196 may be operable to modify the boundary of the region in response to the modification request, which may include increasing performance of the at least one subsystem by reshaping the boundary of the at least one subsystem from a shape in the modification request. In response to input on the control device, a boundary modification request may be sent to the division calculation module 190, and received by the input section 194. In some embodiments, the boundary modification request may be submitted to a boundary managing section, such as boundary managing section 144. In other embodiments, performance of subsystems may be verified before submission to the boundary managing section. If the performance cannot be verified, then the requested shape of the boundary may be modified.

Figure 14:
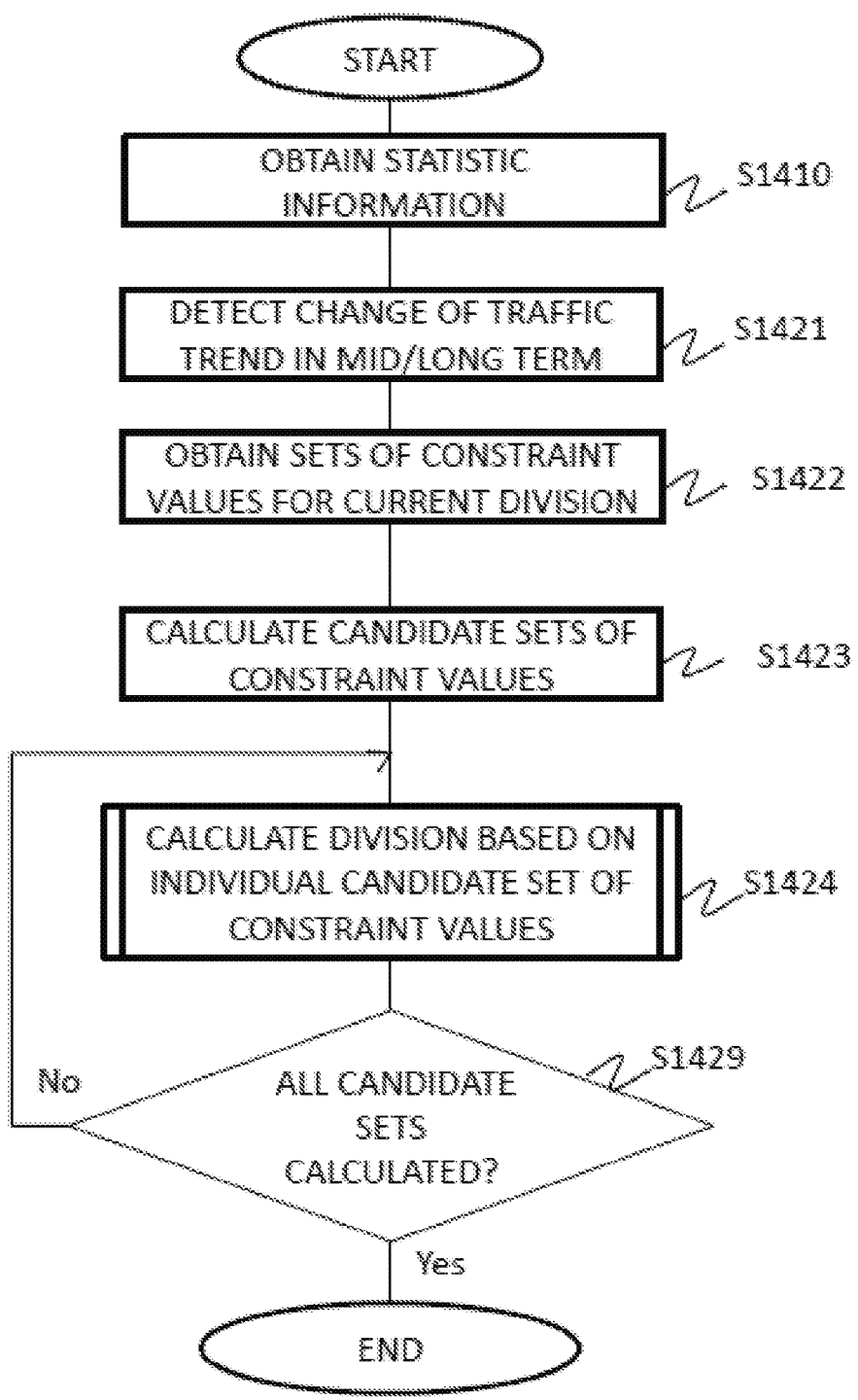
FIG. 14 shows an operational flow for determining divisions of a geographic space based on statistic information, according to an embodiment of the present invention.

FIG. 14 shows an operational flow for determining divisions of a geographic space based on statistic information, according to an embodiment of the present invention. The present embodiment describes an example in which the system performs operations from S1410 to S1429 to determine divisions of the geographical space. FIG. 14 shows one example of the operational flow of the division calculation module 190 shown in FIG. 13, but the division calculation module 190 shown in FIG. 13 is not limited to using this operational flow, and the operational flow of FIG. 14 may be performed by other division calculation modules.

At S1410, statistic information may be obtained by an obtaining section, such as obtaining section 191. At S1421, the obtaining section may detect trends in traffic changes. The term for detecting changes may be any time period such as days, weeks, months, years, etc. For example, some cells may exhibit increasing traffic and events, according to the statistic information, while other cells may exhibit decreasing traffic and events, according to the statistic information. At S1422, the obtaining section may obtain a set of constraint values for a current objective function. At S1423, a calculating section, such as calculating section 193, may calculate a candidate set of constraint values for each of any number of alternate objective functions. Examples of constraints for an objective function of a performance objective include: Load values of all the subsystems do not exceed a threshold; Averages of load values between the subsystems are substantially equal (the difference between average values is not more than a constant value); A load value of a subsystem responsible for a specific region is always not more than a constant value; The number of regions and/or the number of subsystems in operation is not more than a constant value; etc. Each objective function may include more than one constraint. At S1424, a dividing section, such as dividing section 192 may determine a division of regions for the geographical space for a candidate set of a single objective function. The calculated performance indicator of each cell in the geographic space may be used by the dividing section to determine optimized region boundaries. At S1429, if the dividing section has determined a division of regions for each objective function, then the process is ended. If, at S1429, the dividing section has not determined a division of regions for every objective function, then S1424 is repeated for an uncalculated objective function.

Figure 15:
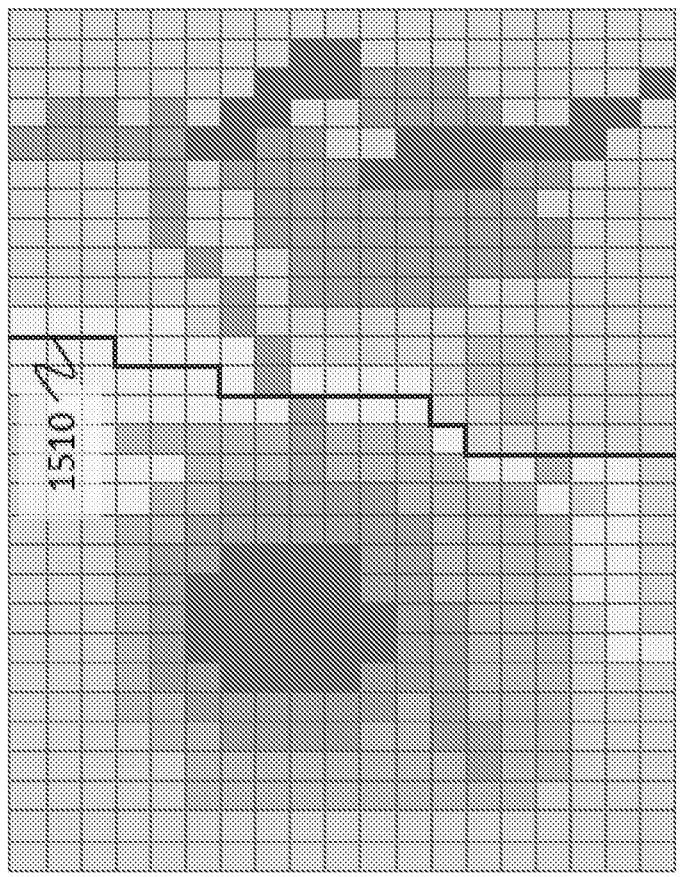
FIG. 15 shows an optimized region boundary, according to an embodiment of the present invention.

FIG. 15 shows an optimized region boundary, according to an embodiment of the present invention. A portion of a geographic space is shown in FIG. 15 divided into a matrix of cells. Each cell is represented by a shade of gray representing the performance indicator of the cell as calculated by the performance indicator function. Lighter shades of gray may represent lower performance indicator values, and darker shades of gray may represent higher performance indicator values. In consideration of these performance indicator values, a division calculation module, such as division calculation module 190, has determined an optimal boundary 1510 of cell separation. The boundary 1510 may be an optimized boundary resulting from a calculated division according to a set of constraints of an objective function. As shown, each cell appears wholly on one side or the other of the boundary 1510, because the division calculation module may only consider cells as a whole. Thus, if smaller cells are used in the division calculation, then the optimal boundary may not appear exactly the same despite using the same objective function.

Figure 16:
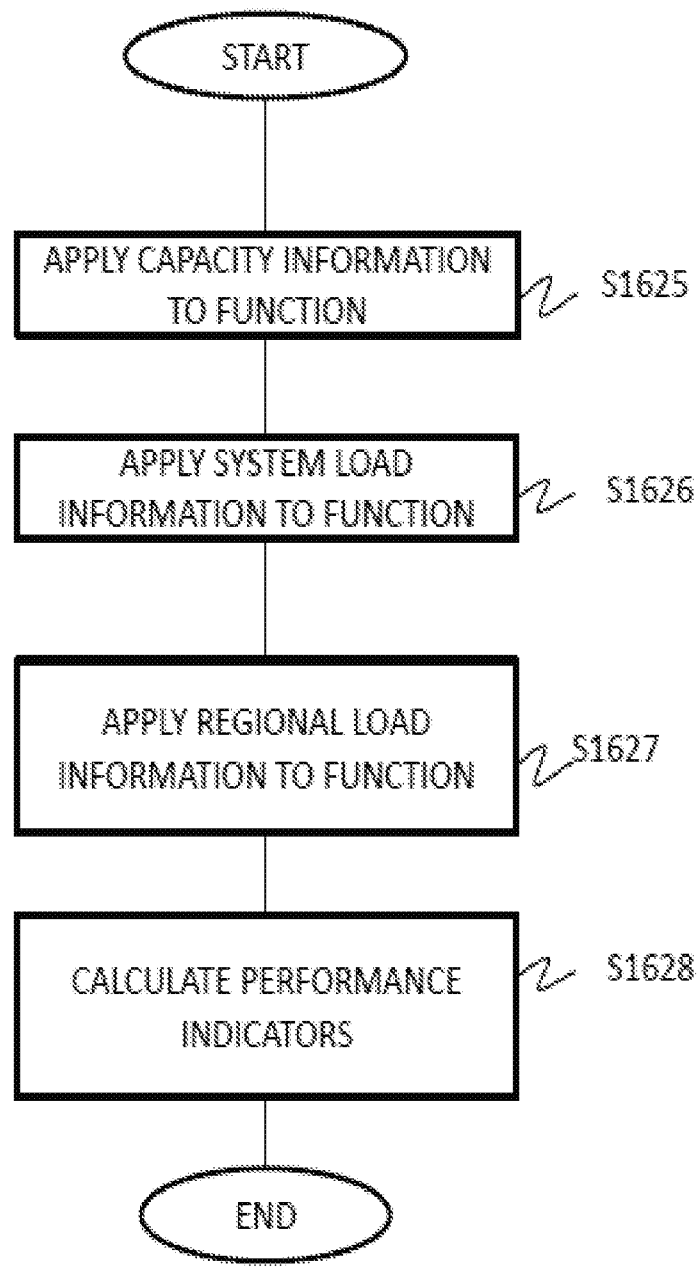
FIG. 16 shows an operational flow for calculating a division of a geographic space based on a candidate set of constraint values, according to an embodiment of the present invention.

FIG. 16 shows an operational flow for calculating a division of a geographic space based on a candidate set of constraint values, according to an embodiment of the present invention. The present embodiment describes an example in which the system performs operations from S1625 to S1628 to determine divisions of the geographical space. FIG. 16 shows one example of the operational flow of the division calculation module 190 shown in FIG. 13, but the division calculation module 190 shown in FIG. 13 is not limited to using this operational flow, and the operational flow of FIG. 16 may be performed by other division calculation modules.

At S1625, a dividing section, such as dividing section 192 may apply capacity information of each cell to a performance indicator function. At S1626, the dividing section may apply system load information to the performance indicator function. At S1627, the dividing section may apply regional load information to the performance indicator function. At S1628, the dividing section may calculate the performance indicators for each cell. In some embodiments, the dividing section may perform the operational flow of FIG. 16 once for each individual cell.

Figure 17:
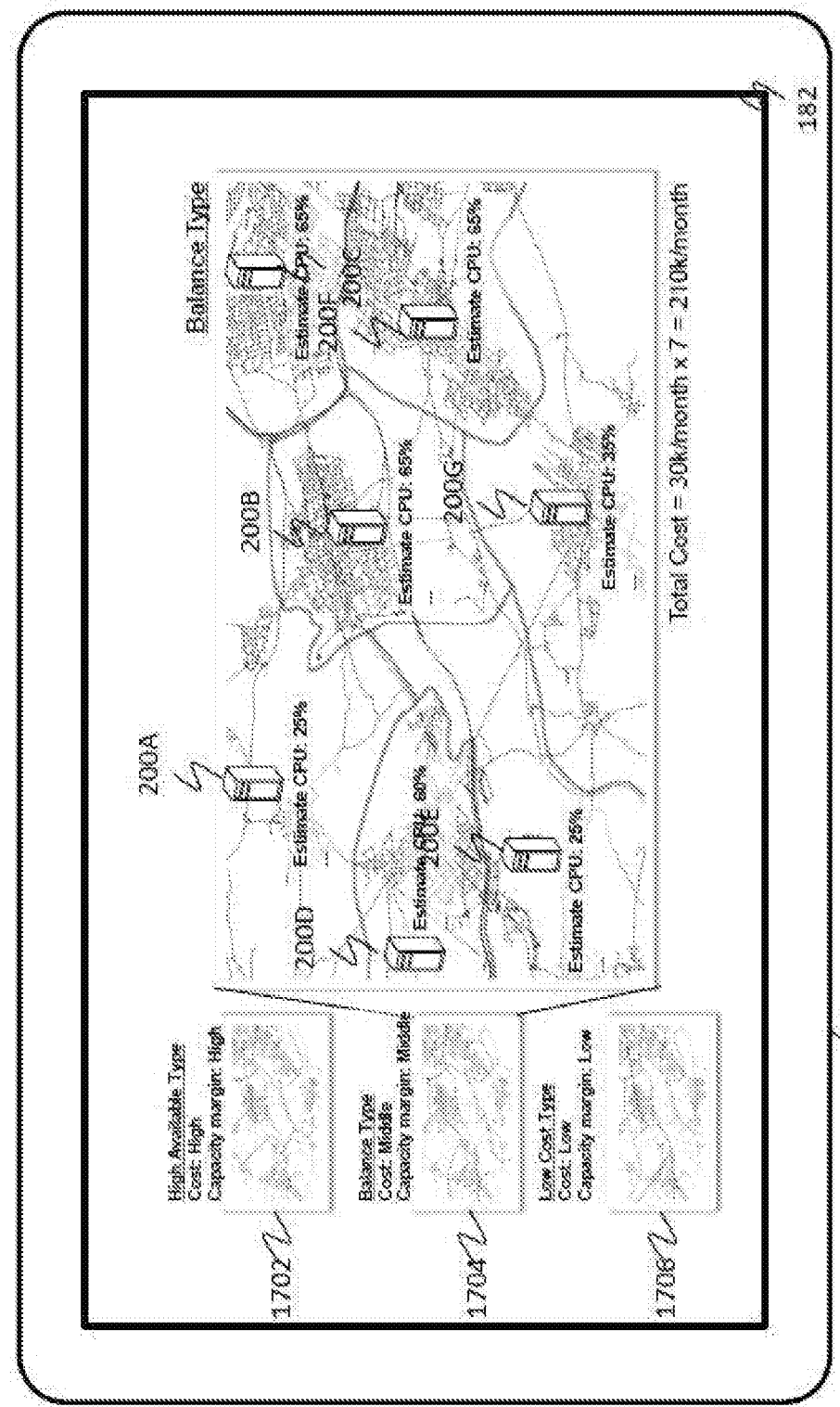
FIG. 17 shows a graphical presentation of candidate divisions of a geographical space, according to an embodiment of the present invention.

FIG. 17 shows a graphical presentation of candidate divisions of a geographical space, according to an embodiment of the present invention. A screen generating section, such as screen generating section 195, may present the graphical presentation on a display 182 of a control device 180. The screen generating section may present calculated region to a user through a user interface. The screen generating section may display a regionally-divided map of the geographic space and relationships with regional maps and servers 200A-G. The screen generating section may show each server 200 along with an estimated central processing unit (CPU) usage, based on calculated performance indicator information. The screen generating section supplies each region with capacity information of a corresponding subsystem from the statistical information database. Based on the performance indicator, the screen generating section may assign a color representing health as an overlay in each region. The screen generating section may present the regions calculated by a division calculation module, such as division calculation module 190, on a map, and present color-coding according to the performance indicator in each region. To the left of the map including the estimated CPU usage, the screen generating section presents a selection of divisions according to difference objective functions. Each division selection includes a preview map. Division selection 1702 may be for an objective function aimed at high availability of servers. As an example of high availability, redundant servers, such as mirror servers, are used to prepare for sudden shutdowns of a server, to prepare for fluctuation of loads, etc. Division selection 1704 may be for an objective function aimed at a balance between available servers and energy consumption. Division selection 1706 may be for an objective function aimed at low energy consumption. From this screen, a user may select a division through an input of the control device 180. In other embodiments, the screen generating section may present memory consumption and network traffic.

Figure 18:
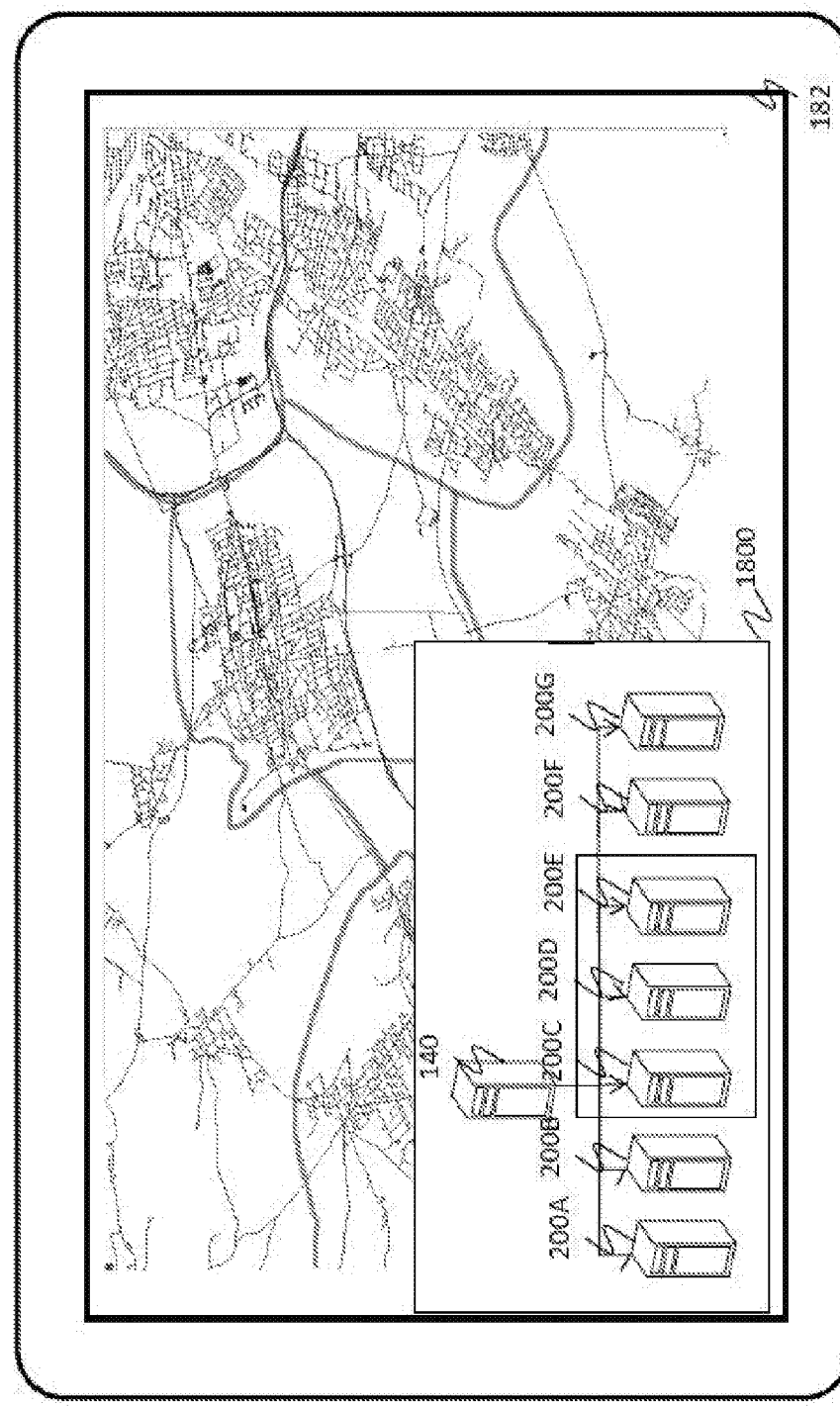
FIG. 18 shows a graphical presentation of server topology and region map interaction, according to an embodiment of the present invention.

FIG. 18 shows a graphical presentation of a server topology 1800 and region map interaction, according to an embodiment of the present invention. A screen generating section, such as screen generating section 195, may present a map area of a geographic space managed by a system, such as system 100, on a display 182 of control device 180. In this graphical presentation, the screen generating section may present the server topology 1800 alongside the map area. The screen generating section may present the server topology 1800 with a detailed view of the server configuration of the system. The server configuration includes regional manager 140 and servers 200A-G. When selecting a region in such a map view, the affected servers are indicated in the server topology 1800. In response to selection of one or more regions, such as through an input of the control device 180, the screen generating section may highlight one or more servers in the server topology 1800. As shown, the screen generating section has highlighted servers 200C, 200D, and 200E in response to a selection of the region(s) managed by servers 200C, 200D, and 200E. In some embodiments, the screen generating section may present the amount of network traffic in server topology 1800.

Figure 19:
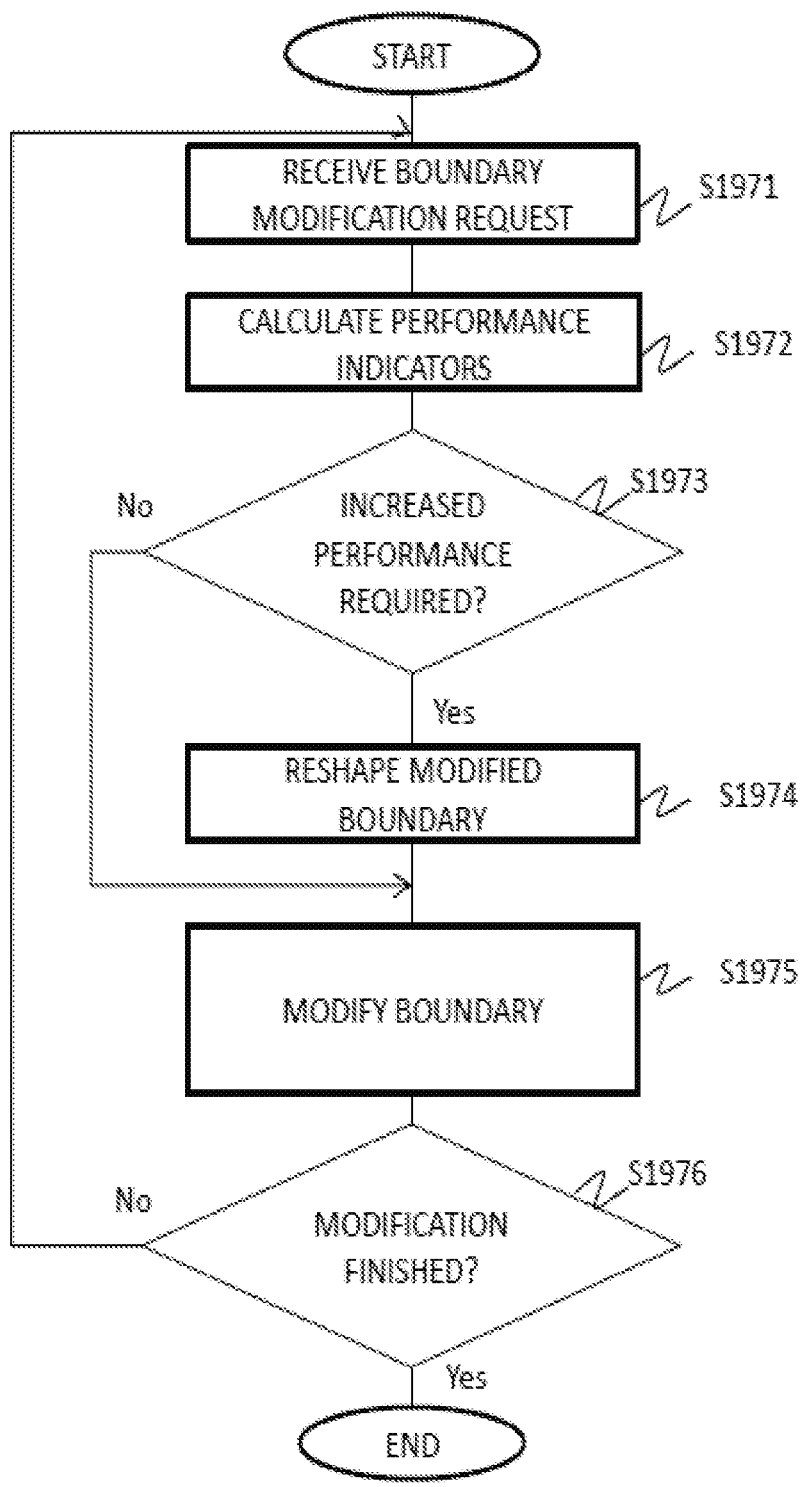
FIG. 19 shows an operational flow for applying a user-modified boundary, according to an embodiment of the present invention.

FIG. 19 shows an operational flow for applying a user-modified boundary, according to an embodiment of the present invention. The present embodiment describes an example in which the system performs operations from S1971 to S1976 to determine divisions of the geographical space. FIG. 19 shows one example of the operational flow of the modifying section 196 shown in FIG. 13, but modifying section 196 shown in FIG. 13 is not limited to using this operational flow, and the operational flow of FIG. 19 may be performed by other division calculation modules.

At S1971, a modification section, such as modification section 196, receives a modification request, which may include a request to modify a boundary of a region among the plurality of regions, from a control device, such as the control device 180. A boundary modification request may include at least one boundary, and a shape of the boundary. At S1972, performance indicators are calculated for the modified boundaries by a calculation section, such as calculation section 193, for any regions affected by the boundary modification. At S1973, the modification section determines whether the performance indicators are all consistent with the current objective function after modifying the boundaries. If the performance indicators are inconsistent with the objective function, then the process proceeds to S1974. At S1974, the modification section may reshape the modified boundary so that the performance indicators of the affected regions are consistent with the current objective function. If at S1973 the performance indicators are already consistent with the current objective function, then the process skips S1974 and proceeds to S1975. At S1975, the modification section may forward the boundary modification to a boundary managing section, such as the boundary managing section 144, which implements the boundary modification, which may include reassigning portions of the geographic space to different subsystems. At S1976, the modification section verifies whether there are any remaining boundary modifications to receive and/or process. If there are no more boundary modification requests, then the process ends. If there is at least one unprocessed modification request, then the process returns to S1971.

Figure 20A:
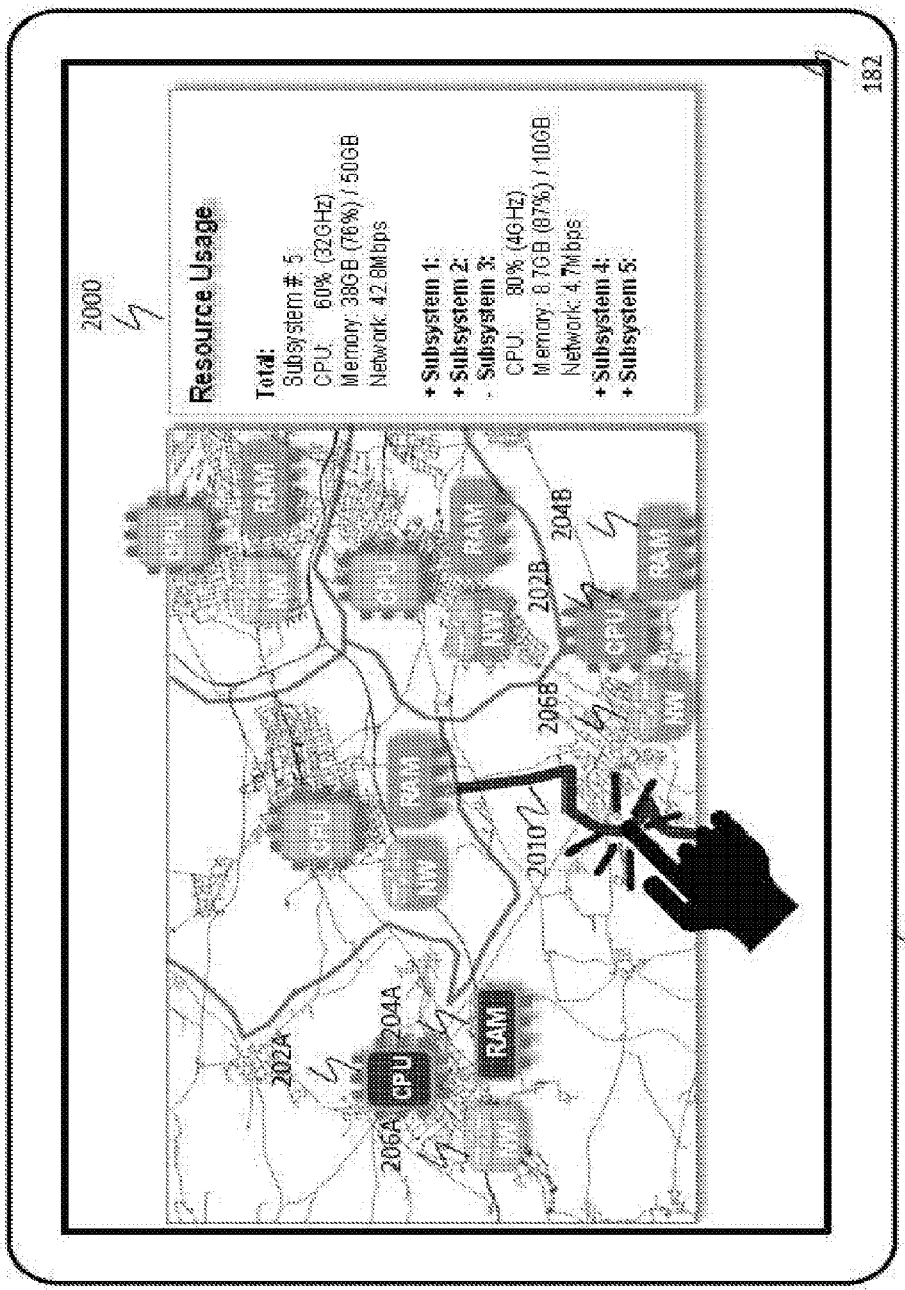
FIGS. 20A-B shows a graphical presentation for boundary modification input, according to an embodiment of the present invention.
Figure 20B:
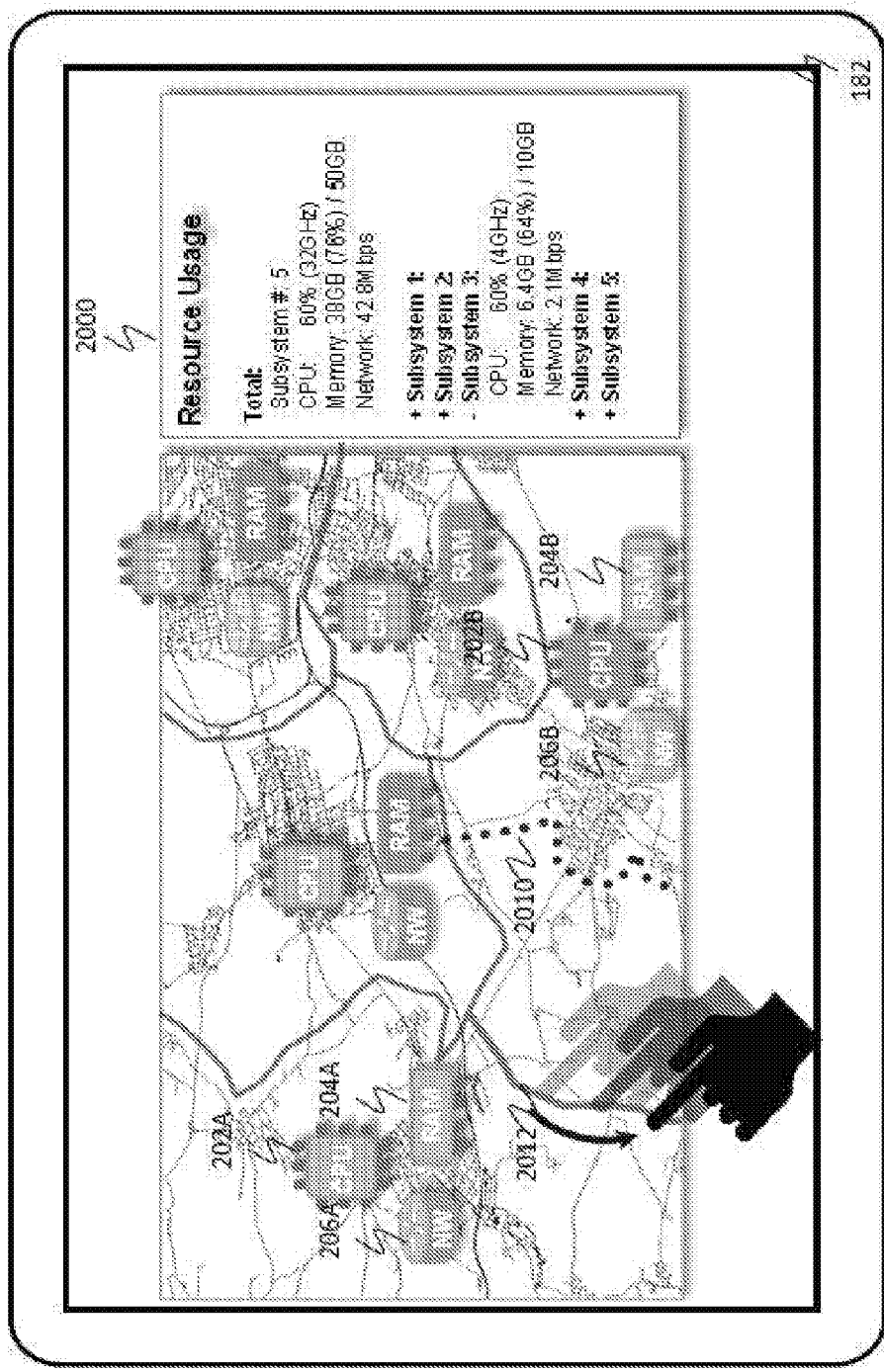

FIGS. 20A-B shows a graphical presentation for boundary modification input, according to an embodiment of the present invention. A screen generating section, such as screen generating section 195, may present a boundary modification interface on a display 182 of control device 180. In the boundary modification interface, a user can modify a regionally-divided area by operation on the screen such as drag-and-drop, click operation, keyboard combination, etc., and accordingly, the boundary modification interface may change the performance indicator based on the statistic information supplied from a statistic information storage, such as statistic information storage 175, and visually support a user to acquire an optimal division, and/or server configuration. The screen generating section may present the boundary modification interface with a status window 2000, which shows details of the statistic information. As shown in FIG. 20A, a processor 202A and a memory 204A are being overloaded, as indicated visually, such as by the darker color, even though a network controller 206A is stable. In a neighboring region, a processor 202B, a memory 204B, and a network controller 206B are all stable. To alleviate the overloaded server, a boundary 2010 is being erased between these regions, which may allow the processor 202B, the memory 204B, and the network controller 206B to share loads of the joint region with the processor 202A, the memory 204A, and the network controller 206A, as shown in FIG. 20A.

In FIG. 20B, a boundary 2012 is being drawn to replace boundary 2010. By modifying a boundary between regions, the screen generating section may dynamically change the indicators that represent resource usage of each subsystem to show how much effect the boundary modification has on system resource usage. A dividing section, such as dividing section 192, may recalculate performance indicators based on the modified boundary, and the screen generating section may change the color-coding or shading according to the calculation result. In response to the newly drawn boundary 2012, the processor 202A, the memory 204A, the network controller 206A, the processor 202B, the memory 204B, and the network controller 206B are all stable.

In other embodiments, a drag-and-drop or flick operation on a boundary of a region may allow a user to modify the form or position of the region on the display 182. Even after regional division is determined and implemented, the performance indicators in each region may be calculated at any time, and the color or shade of each region is changed in the interface according to the calculation result.

Figure 21A:
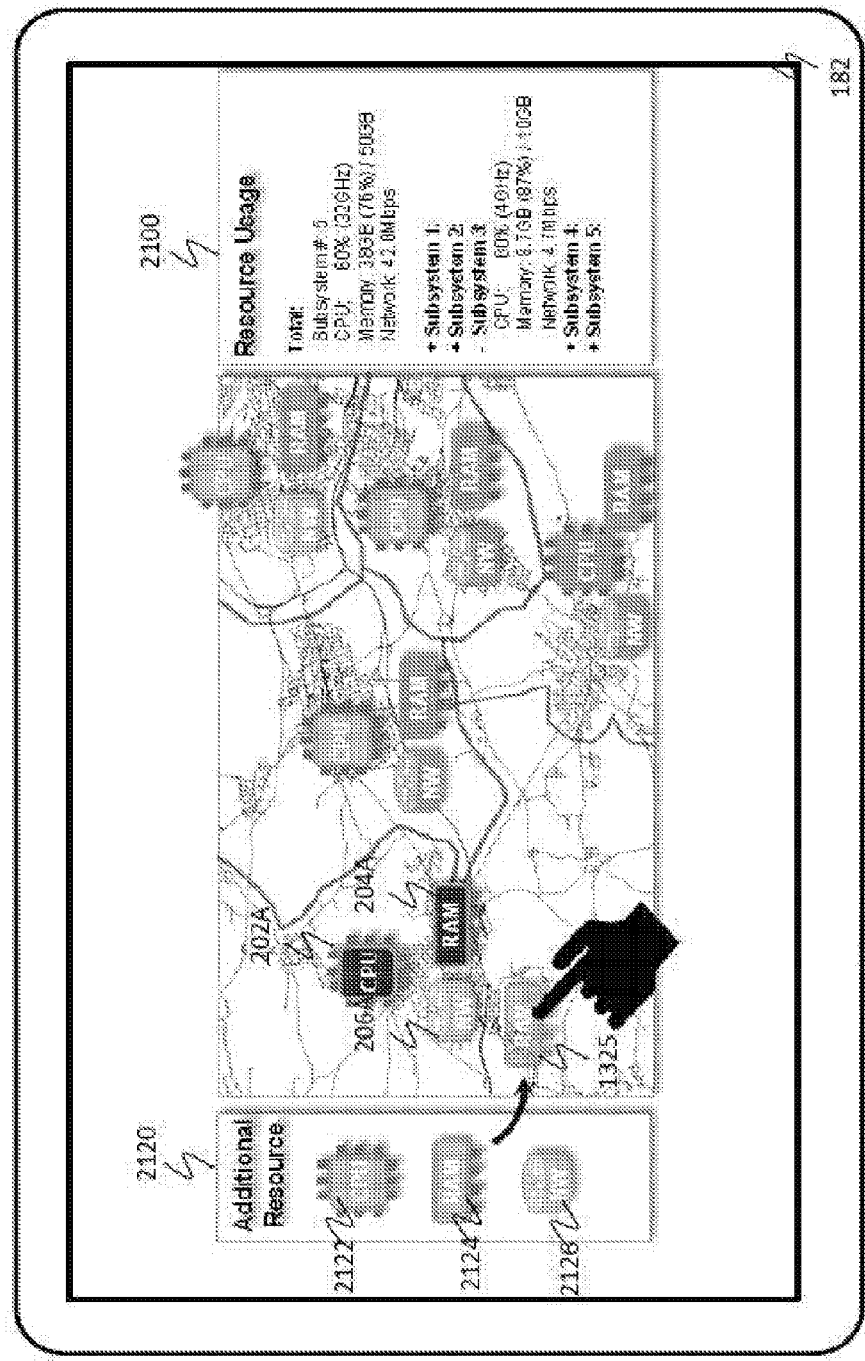
FIGS. 21A-B shows a graphical presentation for regional resource allocation input, according to an embodiment of the present invention.
Figure 21B:
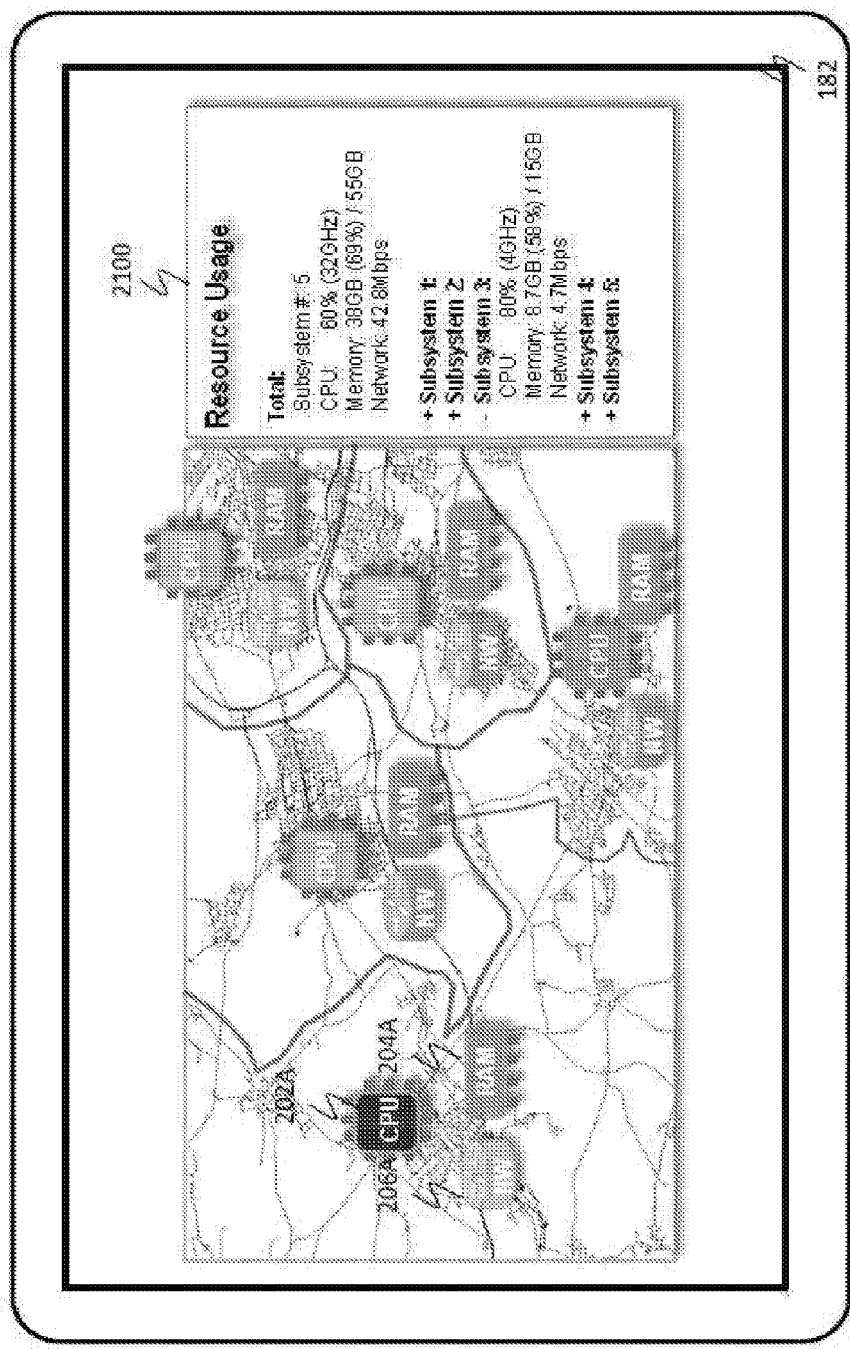

FIGS. 21A-B shows a graphical presentation for regional resource allocation input, according to an embodiment of the present invention. A screen generating section, such as screen generating section 195, may present a regional resource allocation input interface on a display 182 of control device 180. In the regional resource allocation input interface, a user can increase or decrease each subsystem's resources, and the effect will be shown dynamically by changing the resource usage indicators. The regional resource allocation input interface may include a status window 2100, including details of performance indicators, and an additional resource pool 2120, where a user may select additional processing capacity 2122, additional memory capacity 2124, and additional network capacity 2126. As shown in FIG. 21A, a processor 202A and a memory 204A are being overloaded, as indicated by the darker color, even though a network controller 206A is stable. To alleviate the deficiency of the memory 204A, a user may add additional memory 2124 to the memory 204A via a screen operation. In response to this screen operation, control device 180 may submits a hardware work order to a division calculation module, such as division calculation module 190, which may then forward the work order to an appropriate entity capable of physically upgrading hardware of the system. Alternatively, the division calculation module may forward the work order to a boundary managing section, such as boundary managing section 144, which may find and select an unused or redundant server matching the increased memory requirement, then may assign control of the region to the selected server. In FIG. 21B, the memory 204A is now stable, as indicated by the lighter shade. However, the processor 202A is still overloaded, as indicated by the darker shade.

Figure 22A:
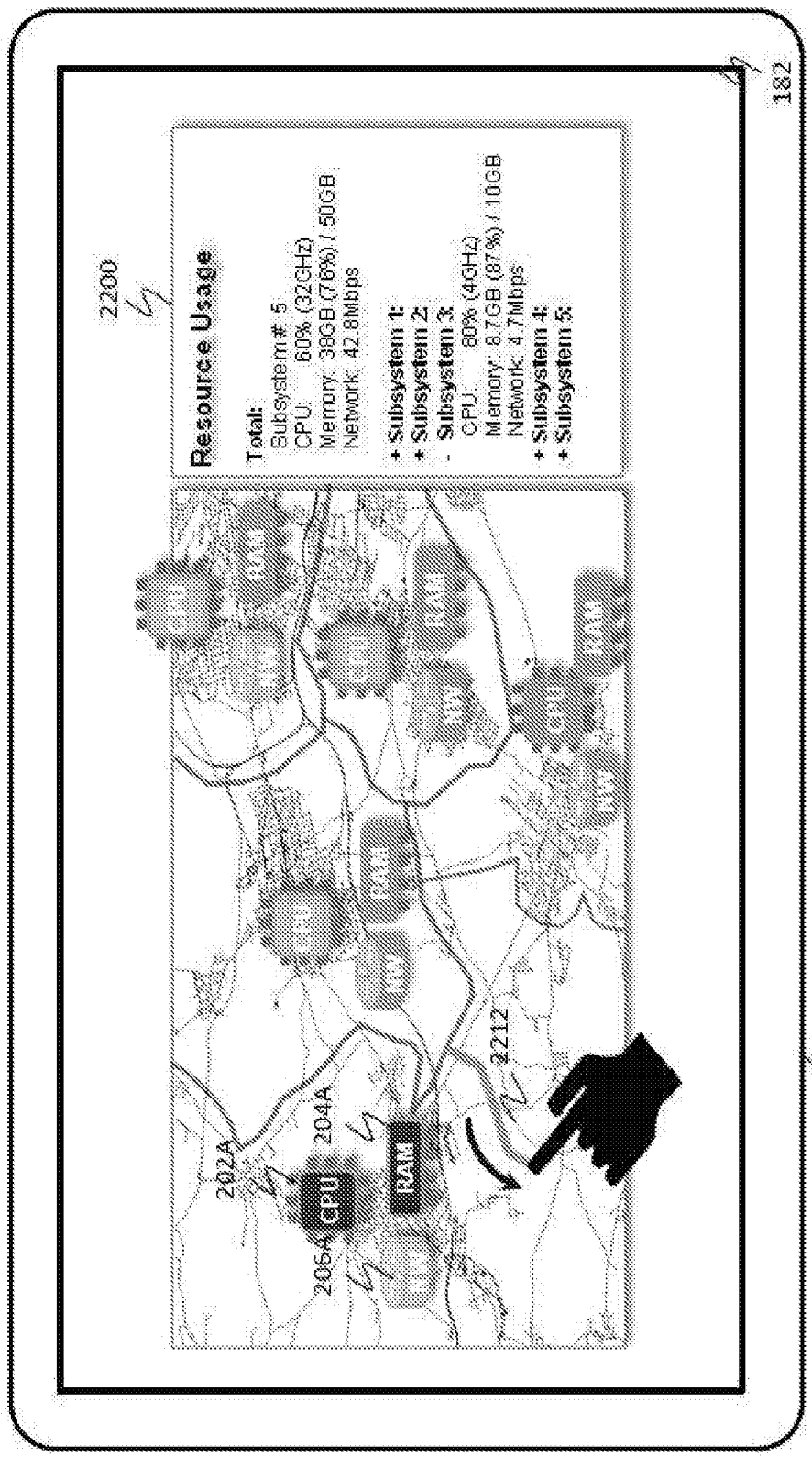
FIGS. 22A-B shows a graphical presentation for regional division and resource allocation input, according to an embodiment of the present invention.
Figure 22B:
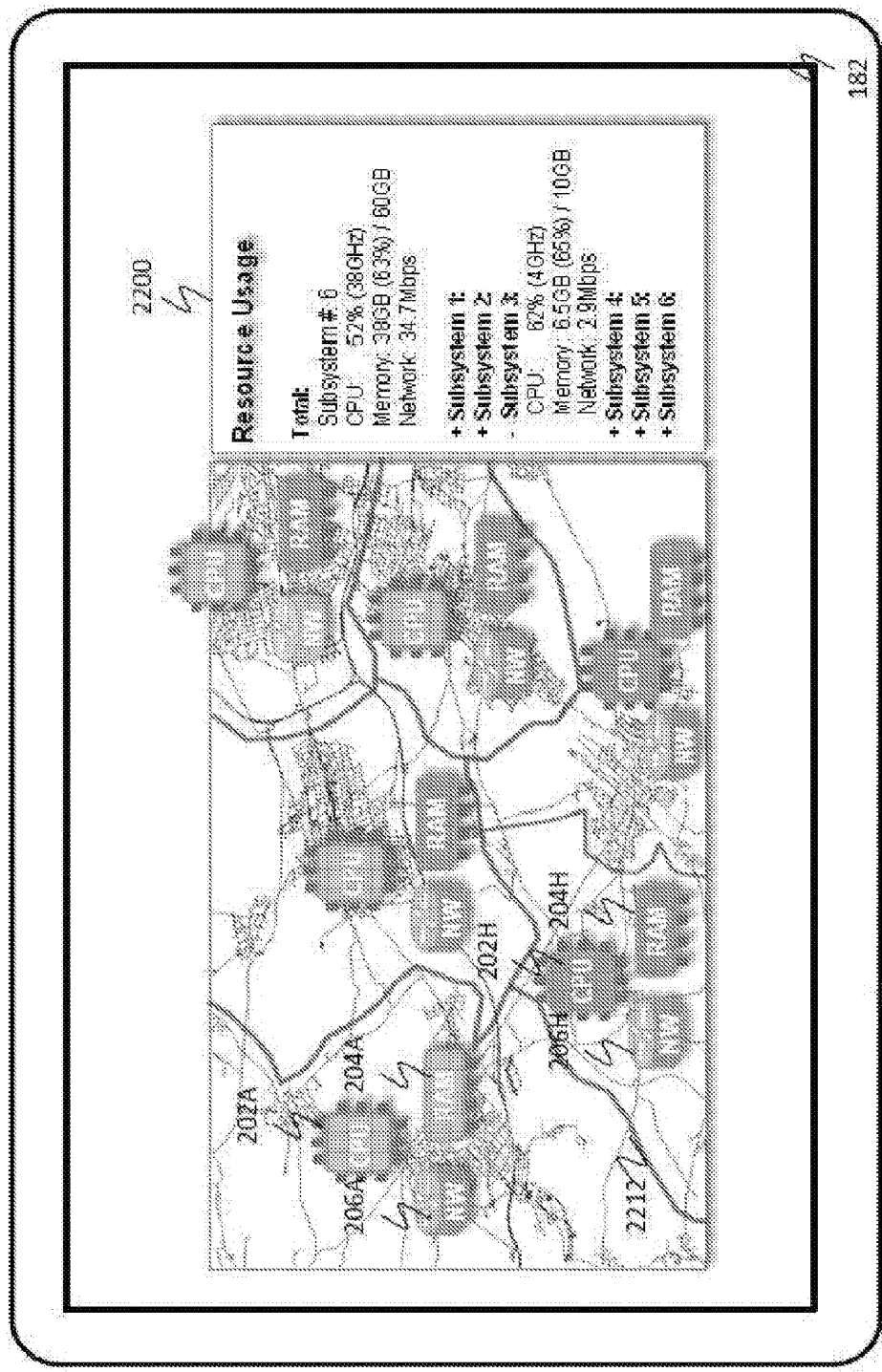

FIGS. 22A-B shows a graphical presentation for regional division and resource allocation input, according to an embodiment of the present invention. A screen generating section, such as screen generating section 195, may present a regional division and resource allocation input interface on a display 182 of control device 180. In the regional division and resource allocation input interface, a user can add a boundary to create a new region and managing subsystem, and the screen generating section may present the effect dynamically by displaying new resource usage indicators. The regional division and resource allocation input interface may include a status window 2200, including details of performance indicators. As shown in FIG. 22A, a processor 202A and a memory 204A are being overloaded, as indicated by the darker color, even though a network controller 206A is stable. To alleviate the deficiency of the processor 202A, and the memory 204A, a new boundary 2212 is being drawn, creating a new region and managing subsystem. The new managing subsystem may include a processor 202H, a memory 204H, and a network controller 206H. In FIG. 22B, the processor 202A and the memory 204A are now stable, as indicated by the lighter shade, due to the newly added subsystem relieving part of the load.

Figure 23:
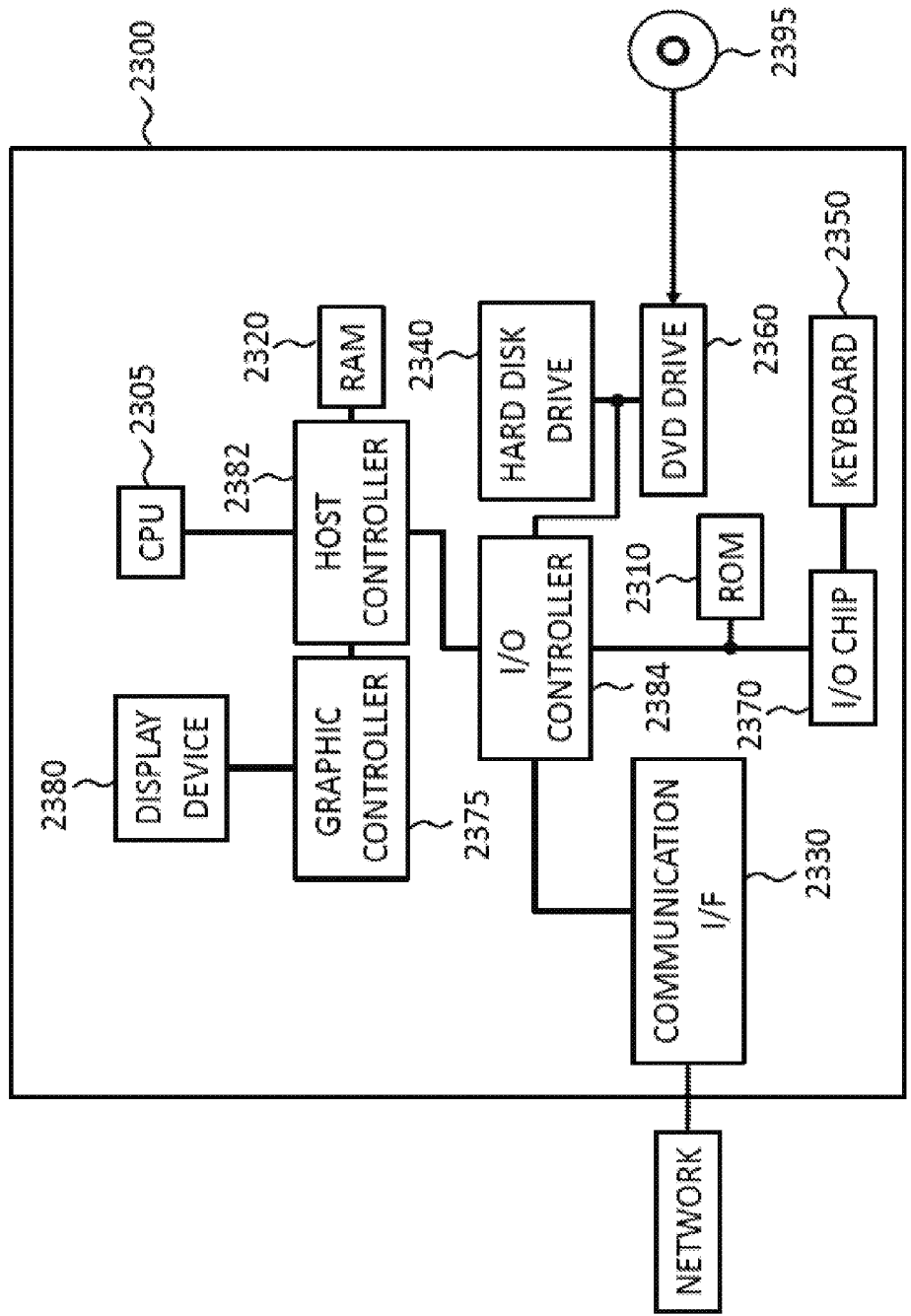
FIG. 23 shows an exemplary hardware configuration of a computer that functions as a system, according to an embodiment of the present invention.

FIG. 23 shows an exemplary configuration of a computer 2300 according to an embodiment of the invention. The computer 2300 according to the present embodiment includes a CPU 2305, a RAM 2320, a graphics controller 2375, and a display apparatus 2380 which are mutually connected by a host controller 2382. The computer 2300 also includes input/output units such as a communication interface 2330, a hard disk drive 2340, and a DVD-ROM drive 2360 which are connected to the host controller 2382 via an input/output controller 2384. The computer also includes legacy input/output units such as a ROM 2310 and a keyboard 2350 which are connected to the input/output controller 2384 through an input/output chip 2370.

The host controller 2382 connects the RAM 2320 with the CPU 2305 and the graphics controller 2375 which access the RAM 2320 at a high transfer rate. The CPU 2305 operates according to programs stored in the ROM 2310 and the RAM 2320, thereby controlling each unit. The graphics controller 2375 obtains image data generated by the CPU 2305 on a frame buffer or the like provided in the RAM 2320, and causes the image data to be displayed on the display apparatus 2380. Alternatively, the graphics controller 2375 may contain therein a frame buffer or the like for storing image data generated by the CPU 2305.

The input/output controller 2384 connects the host controller 2382 with the communication interface 2330, the hard disk drive 2340, and the DVD-ROM drive 2360, which are relatively high-speed input/output units. The communication interface 2330 communicates with other electronic devices via a network. The hard disk drive 2340 stores programs and data used by the CPU 2305 within the computer 2300. The DVD-ROM drive 2360 reads the programs or the data from the DVD-ROM 2395, and provides the hard disk drive 2340 with the programs or the data via the RAM 2320.

The ROM 2310 and the keyboard 2350 and the input/output chip 2370, which are relatively low-speed input/output units, are connected to the input/output controller 2384. The ROM 2310 stores therein a boot program or the like executed by the computer 2300 at the time of activation, a program depending on the hardware of the computer 2300. The keyboard 2350 inputs text data or commands from a user, and may provide the hard disk drive 2340 with the text data or the commands via the RAM 2320. The input/output chip 2370 connects a keyboard 2350 to an input/output controller 2384, and may connect various input/output units via a parallel port, a serial port, a keyboard port, a mouse port, and the like to the input/output controller 2384.

A program to be stored on the hard disk drive 2340 via the RAM 2320 is provided by a recording medium as the DVD-ROM 2395, and an IC card. The program is read from the recording medium, installed into the hard disk drive 2340 within the computer 2300 via the RAM 2320, and executed in the CPU 2305.

A program that is installed in the computer 2300 and causes the computer 2300 to function as a system, such as system 100 of FIG. 1, includes an acquiring module, an analyzing module, a dividing module, a region managing module, a storage module, a boundary managing module, a determining module, a receiving module, a transmitting module, a gateway module, a judging module, a monitoring module, a subsystem module a managing module, and an identifying module. The program or module acts on the CPU 2305, to cause the computer 2300 to function as an acquiring section, an analyzing section, a dividing section, a region manager, a storage section, a boundary managing section, a determining section, a receiving section, a transmitting section, a gateway apparatus, a judging section, a monitoring section, a subsystem, a managing section, and an identifying section, such as the acquiring section 110, the analyzing section 120, the dividing section 130, the region manager 140, the memory unit 142, the boundary managing section 144, the determining section 146, the receiving section 150, the transmitting section 152, the gateway apparatus 160, the judging section 162, the monitoring section 170, the subsystem 200, the managing section 210, and the identifying section 220 described above.

The information processing described in these programs is read into the computer 2300, to function as an acquiring section, an analyzing section, a dividing section, a region manager, a storage section, a boundary managing section, a determining section, a receiving section, a transmitting section, a gateway apparatus, a judging section, a monitoring section, a subsystem, a managing section, and an identifying section, which are the result of cooperation between the program or module and the above-mentioned various types of hardware resources. Moreover, the system is constituted by realizing the operation or processing of information in accordance with the usage of the computer 2300.

For example when communication is performed between the computer 2300 and an external device, the CPU 2305 may execute a communication program loaded onto the RAM 2320, to instruct communication processing to a communication interface 2330, based on the processing described in the communication program. The communication interface 2330, under control of the CPU 2305, reads the transmission data stored on the transmission buffering region provided in the recording medium, such as a RAM 2320, a hard disk drive 2340, or a DVD-ROM 2395, and transmits the read transmission data to a network, or writes reception data received from a network to a reception buffering region or the like provided on the recording medium. In this way, the communication interface 2330 may exchange transmission/reception data with the recording medium by a DMA (direct memory access) method, or by a configuration that the CPU 2305 reads the data from the recording medium or the communication interface 2330 of a transfer destination, to write the data into the communication interface 2330 or the recording medium of the transfer destination, so as to transfer the transmission/reception data.

In addition, the CPU 2305 may cause all or a necessary portion of the file of the database to be read into the RAM 2320 such as by DMA transfer, the file or the database having been stored in an external recording medium such as the hard disk drive 2340, the DVD-ROM drive 2360 (DVD-ROM 2395) to perform various types of processing onto the data on the RAM 2320. The CPU 2305 may then write back the processed data to the external recording medium by means of a DMA transfer method or the like. In such processing, the RAM 2320 can be considered to temporarily store the contents of the external recording medium, and so the RAM 2320, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2305 may also use a part of the RAM 2320 to perform reading/writing thereto on the cache memory. In such an embodiment, the cache is considered to be contained in the RAM 2320, the memory, and/or the recording medium unless noted otherwise, since the cache memory performs part of the function of the RAM 2320.

The CPU 2305 may perform various types of processing, onto the data read from the RAM 2320, which includes various types of operations, processing of information, condition judging, search/replace of information, etc., as described in the present embodiment and designated by an instruction sequence of programs, and writes the result back to the RAM 2320. For example, when performing condition judging, the CPU 2305 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2305 may search for information in a file, a database, etc., in the recording medium. For example, when a plurality of entries, each having an attribute value of a first attribute is associated with an attribute value of a second attribute, are stored in a recording apparatus, the CPU 2305 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2395, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 2300 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize a system for geographic space management.

What is claimed is:

1. A computer-implemented method comprising:
    performing data processing, by a plurality of subsystems, the data processing relating to traffic of a plurality of regions, the plurality of regions obtained by dividing a geographic space;
    obtaining statistical information of a subsystem among the plurality of subsystems, the statistical information relating to a load of the subsystem;
    defining a boundary between a first region of the plurality of regions and a second region of the plurality of regions based on the statistic information, wherein a first subsystem manages a first mobile object located in the geographic space defined by the first region and a second subsystem manages a second mobile object located in the geographic space defined by the second region;
    calculating a performance indicator for the first region of the plurality of regions based on a current statistic information, wherein the performance indicator is a function of a parameter of the statistical information included in the current statistic information, and wherein the current statistic information is statistical information obtained within a threshold time;
    determining whether the performance indicator for the first region of the plurality of regions exceeds a performance threshold;
    changing the boundary between the first region of the plurality of regions and the second region of the plurality of regions based on determining that the performance indicator for the first region of the plurality of regions exceeds a performance threshold, wherein changing the boundary improves the performance indicator for the first region of the plurality of regions; and
    wherein the statistical information comprises a number of routes crossing a boundary between the first region and a third region, wherein the routes are paths on which the mobile object moves.

2. The computer-implemented method of claim 1, further comprising:
    generating a screen image showing a map of the geographic space, a boundary of each region, and a performance indicator of each region.

3. The computer-implemented method of claim 1, further comprising:
    receiving a modification request from a control device through a user interface, wherein the modification request includes a request to modify a boundary of a region among the plurality of regions.

4. A computer program product comprising a non-transitory computer readable storage medium having program instructions embodied therewith, the program instructions executable by a computer to cause the computer to perform operations comprising:
    performing data processing, by a plurality of subsystems, the data processing relating to traffic, of a plurality of regions, the plurality of regions obtained by dividing a geographic space;
    obtaining statistical information of a subsystem among the plurality of subsystems, the statistical information relating to a load of the subsystem;
    defining a boundary between a first region of the plurality of regions and a second region of the plurality of regions based on the statistic information, wherein a first subsystem manages the mobile object located in the geographic space defined by the first region and a second subsystem manages a second mobile object located in the geographic space defined by the second region;
    calculating a performance indicator for the first region of the plurality of regions based on a current statistic information, wherein the performance indicator is a function of a parameter of the statistical information included in the current statistic information, and wherein the current statistic information is statistical information obtained within a threshold time;
    determining whether the performance indicator for the first region of the plurality of regions exceeds a performance threshold;
    changing the boundary between the first region of the plurality of regions and the second region of the plurality of regions based on determining that the performance indicator for the first region of the plurality of regions exceeds a performance threshold, wherein changing the boundary improves the performance indicator for the first region of the plurality of regions; and
    wherein the statistical information comprises a number of routes crossing a boundary between the first region and a third region, wherein the routes are paths on which the mobile object moves.

5. The computer program product of claim 4, wherein the operations further comprise:
    calculating a performance indicator of the subsystem, wherein the performance indicator is a function of a statistics parameter included in the statistic information.

6. The computer program product of claim 5, wherein the operations further comprise:
    receiving a modification request from a control device through a user interface, wherein the modification request includes a request to modify a boundary of a region among the plurality of regions.

7. A computer system for managing mobile objects, the computer system comprising:
    a processor, a computer-readable storage medium, and program instructions stored on the computer-readable storage medium for execution by the processor, the program instructions comprising:
    program instructions to create a plurality of subsystems operable to perform management of a plurality of regions, wherein management of the plurality of regions by the plurality of subsystems comprises receiving route information from a mobile object, and transmitting route information to the mobile object, wherein the mobile object is located in a region of the plurality of regions, and wherein the plurality of regions divide a geographic space;
    program instructions to obtain statistical information of a subsystems of the plurality of subsystems, wherein the statistical information relates to a load used in managing the subsystem;
    program instructions to define a boundary between a first region of the plurality of regions and a second region of the plurality of regions based on the statistic information, wherein a first subsystem manages a first mobile object located in the geographic space defined by the first region and a second subsystem manages a second mobile object located in the geographic space defined by the second region;

program instructions to calculate a performance indicator for the first region of the plurality of regions based on a current statistic information, wherein the performance indicator is a function of a parameter of the statistical information included in the current statistic information, and wherein the current statistic information is statistic information obtained within a threshold time;

program instructions to determine whether the performance indicator for the first region of the plurality of regions exceeds a performance threshold;

program instructions to change the boundary between the first region of the plurality of regions and the second region of the plurality of regions based on determining that the performance indicator for the first region of the plurality of regions exceeds a performance threshold, wherein changing the boundary improves the performance indicator for the first region of the plurality of regions; and wherein the statistical information comprises a number of routes crossing a boundary between the first region and a third region, wherein the routes are paths on which the mobile object moves.

8. The system of claim 7, further comprising:
program instructions to receive the function of the performance indicator from a control device through a user interface.

9. The system of claim 7, wherein the statistical information further comprises an element selected from the group consisting of: capacity information, system load information and regional load information.

10. The system of claim 9, wherein the capacity information includes a capacity of an element selected from the group consisting of: the processor, the computer-readable memory, a network communication volume of a subsystem of the plurality of subsystems, and combinations thereof.

11. The system of claim 9, wherein the system load information includes a usage rate of the subsystem.

12. The system of claim 9, wherein the regional load information includes information from the group consisting of: a number of mobile objects in a third region of the subsystem, a number of events occurring in the third region, a number of routes in the third region.

13. The system of claim 7, further comprising program instructions to:
determine a division of the geographic space that can improve the performance indicator; and
recommend the division of the geographic space through a user interface of a control device.

14. The system of claim 7, further comprising program instructions to generate a screen image showing a map of the geographic space, a boundary of each region, and a performance indicator of each region.

15. The system of claim 7, further comprising program instructions to receive a modification request from a control device through a user interface, wherein the modification request includes a request to modify a boundary of a region among the plurality of regions.

16. The system of claim 15, further comprising:
program instructions to modify the boundary of the region in response to the modification request;
program instructions to calculate a performance indicator; and
program instructions to generate a screen image.

17. The system of claim 16, wherein the modifying includes increasing performance of the subsystem by reshaping the boundary of the subsystem from a shape in the modification request.

18. The system of claim 7, wherein the statistic information comprises the number of mobile objects crossing the boundary between the first region and the second region.

19. The system of claim 7 further comprising:
program instructions to calculate a performance indicator for the second region of the plurality of regions based on the current statistic information;
program instructions to determine whether the difference between the performance indicator for the first region of the plurality of regions and the performance indicator for the second region of the plurality of regions exceeds a difference threshold;
program instructions to change the boundary between the first region of the plurality of regions and the second region of the plurality of regions based on determining that the difference exceeded the difference threshold, wherein changing the boundary reduces the difference between the performance indicator for the first region of the plurality of regions and the performance indicator for the second region of the plurality of regions.

20. The system of claim 7, wherein the function of the performance indicator further includes statistical information from a historic statistic information.

* * * * *